(12) United States Patent
Naylor

(10) Patent No.: US 9,020,632 B2
(45) Date of Patent: Apr. 28, 2015

(54) STORAGE, RETRIEVAL AND SORTATION SYSTEM

(71) Applicant: Intelligrated Headquarters, LLC, Mason, OH (US)

(72) Inventor: John R. Naylor, Atlanta, GA (US)

(73) Assignee: Intelligrated Headquarters, LLC, Mason, OH (US)

( * ) Notice: Subject to any disclaimer, the term of this patent is extended or adjusted under 35 U.S.C. 154(b) by 105 days.

(21) Appl. No.: 13/843,168

(22) Filed: Mar. 15, 2013

(65) Prior Publication Data

US 2014/0277693 A1    Sep. 18, 2014

(51) Int. Cl.
*G06F 7/00* (2006.01)
*B65G 1/04* (2006.01)

(52) U.S. Cl.
CPC ................................. *B65G 1/0492* (2013.01)

(58) Field of Classification Search
CPC ............ H01L 21/681; H01L 21/67259; H01L 21/67276
USPC ........................................................ 700/218
See application file for complete search history.

(56) References Cited

U.S. PATENT DOCUMENTS

| | | |
|---|---|---|
| 5,135,344 A | 8/1992 | Kita et al. |
| 5,199,840 A | 4/1993 | Castaldi et al. |
| 5,238,349 A | 8/1993 | Grace, Sr. |
| 5,379,229 A | 1/1995 | Parsons et al. |
| 5,636,966 A | 6/1997 | Lyon et al. |
| 5,664,928 A | 9/1997 | Stauber |
| 5,860,784 A | 1/1999 | Schuitema et al. |
| 6,325,586 B1 | 12/2001 | Loy |
| 6,520,735 B2 | 2/2003 | Fallin et al. |
| 6,602,037 B2 | 8/2003 | Winkler |
| 6,652,213 B1 | 11/2003 | Mitchell et al. |
| 6,704,613 B2 | 3/2004 | Gomez |
| 7,261,509 B2 | 8/2007 | Freudelsperger |
| 7,381,022 B1 | 6/2008 | King |
| 7,591,630 B2 | 9/2009 | Lert, Jr. |
| 7,635,246 B2 | 12/2009 | Neeper et al. |
| 7,861,844 B2 | 1/2011 | Hayduchok et al. |
| 7,873,469 B2 | 1/2011 | D'Andrea et al. |
| 7,912,574 B2 | 3/2011 | Wurman et al. |
| 7,991,505 B2 | 8/2011 | Lert, Jr. et al. |

(Continued)

FOREIGN PATENT DOCUMENTS

| | | |
|---|---|---|
| JP | H05-338717 | 12/1993 |
| JP | H09/272611 | 10/1997 |

OTHER PUBLICATIONS

International Search Report and Written Opinion dated Jul. 2, 2014 for Application No. PCT/US2014/027382.

*Primary Examiner* — Gene Crawford
*Assistant Examiner* — Kyle Logan
(74) *Attorney, Agent, or Firm* — Frost Brown Todd LLC

(57) ABSTRACT

A material handling systems provides efficient storage, retrieval and sortation of articles, utilizing a plurality of carts capable of traveling under storage areas with a three dimensional warehouse system and on multiple levels. The carts may convey items from storage to a goods to operator user interface. The carts may function as decoupled sortation units capable of providing sortation at multiple mobile sortation locations, providing vertical sortation. Carts may include conveying surfaces, and sort articles from between carts. Carts may transport more than one article and a plurality of carts may transport a single article.

10 Claims, 27 Drawing Sheets

(56) References Cited

U.S. PATENT DOCUMENTS

| | | |
|---|---|---|
| 7,991,506 B2 | 8/2011 | Schafer |
| 8,092,140 B2 | 1/2012 | Baker et al. |
| 8,104,601 B2 | 1/2012 | Hayduchok et al. |
| 8,170,711 B2 | 5/2012 | D'Andrea et al. |
| 8,220,710 B2 | 7/2012 | Hoffman et al. |
| 8,265,873 B2 | 9/2012 | D'Andrea et al. |
| 8,412,400 B2 | 4/2013 | D'Andrea et al. |
| 8,425,173 B2 | 4/2013 | Lert et al. |
| 2003/0229416 A1* | 12/2003 | Tai et al. .................. 700/213 |
| 2004/0146380 A1* | 7/2004 | Baker et al. ................ 414/273 |
| 2005/0002762 A1 | 1/2005 | Gambarelli et al. |
| 2005/0047895 A1* | 3/2005 | Lert, Jr. ................... 414/273 |
| 2008/0075569 A1 | 3/2008 | Benedict et al. |
| 2008/0247848 A1* | 10/2008 | Freudelsperger ............. 414/277 |
| 2010/0076591 A1 | 3/2010 | Lert, Jr. |
| 2010/0316468 A1 | 12/2010 | Lert et al. |
| 2010/0316470 A1 | 12/2010 | Lert et al. |
| 2010/0322746 A1 | 12/2010 | Lert et al. |
| 2010/0322747 A1 | 12/2010 | Lert et al. |
| 2012/0070255 A1 | 3/2012 | Tsujimoto et al. |
| 2012/0101627 A1 | 4/2012 | Lert |
| 2012/0177465 A1 | 7/2012 | Koholka |
| 2012/0186192 A1 | 7/2012 | Toebes et al. |
| 2012/0186942 A1 | 7/2012 | Toebes et al. |
| 2012/0189410 A1 | 7/2012 | Toebes et al. |
| 2012/0195720 A1 | 8/2012 | Sullivan et al. |

\* cited by examiner

STORAGE, RETRIEVAL AND SORTATION SYSTEM

BACKGROUND

The present disclosure relates generally to material handling systems, and is more particularly directed to a system which provides efficient storage, retrieval and sortation of articles. The innovation will be disclosed in connection with, but not necessarily limited to, a three dimensional warehouse system utilizing a plurality of carts controlled to retrieve, store and sort containers or individual articles, capable of a wide range of uses, including a goods to operator system, a sortation system and a storage and retrieval system.

BRIEF DESCRIPTION OF THE DRAWINGS

The accompanying drawings illustrate embodiments of the invention, and, together with the specification, including the detailed description which follows, serve to explain the principles of the present invention.

Figure 1:
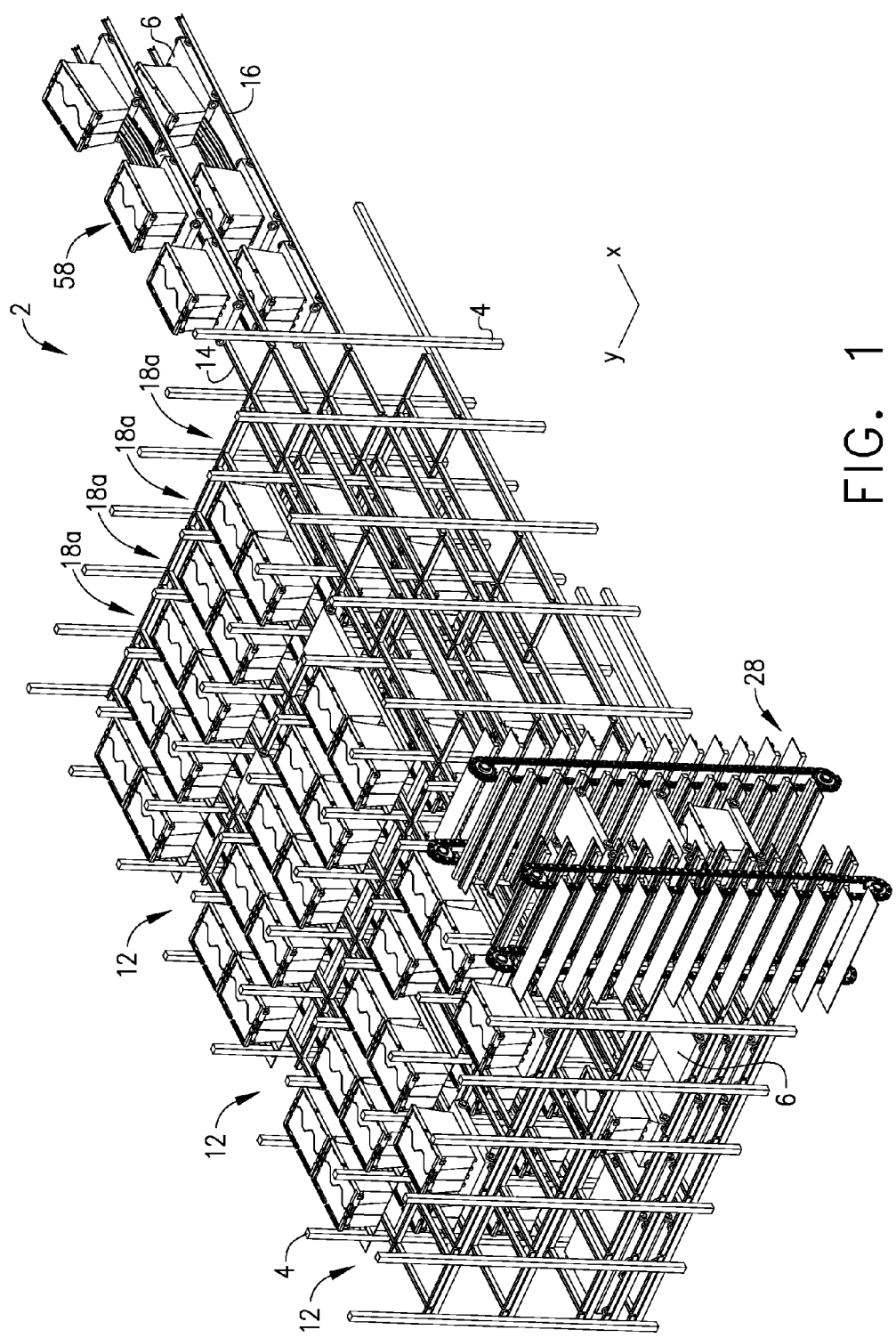
FIG. 1 is a perspective illustration of a portion of a three dimensional warehouse system constructed in accordance with one or more teachings of the present invention.
Figure 2:
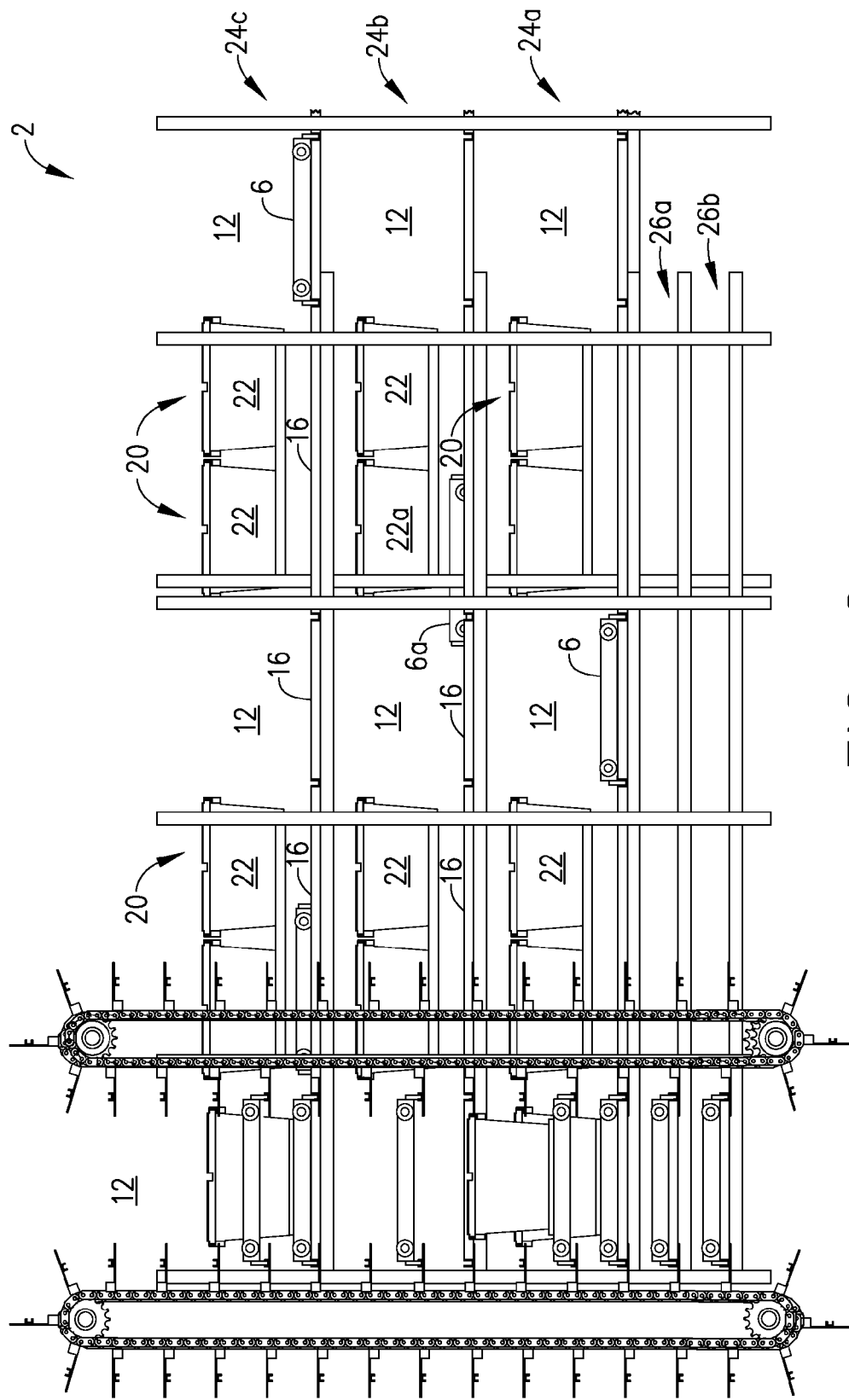
FIG. 2 is a side view of a portion of the warehouse system illustrated in FIG. 1.
Figure 3:
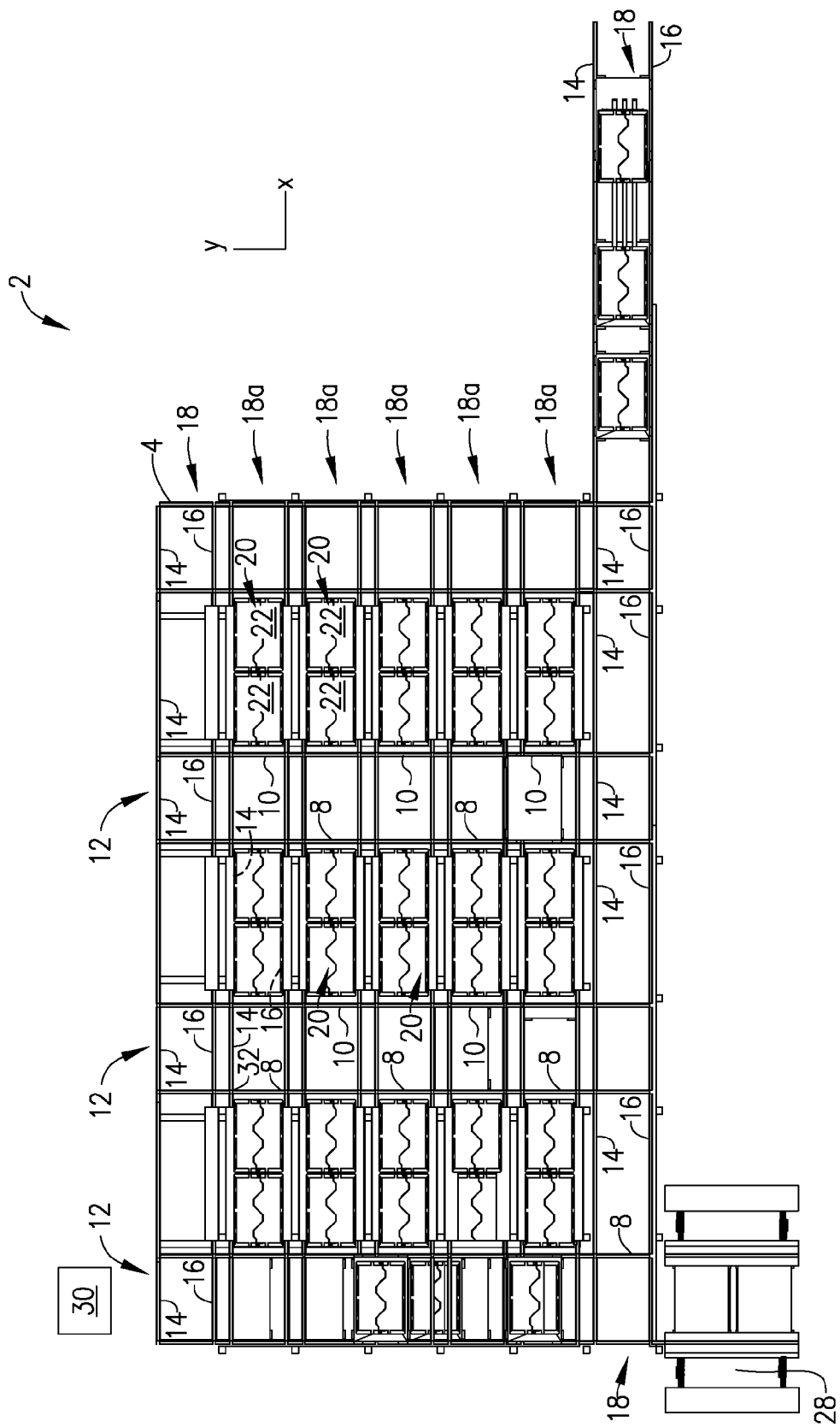
FIG. 3 is a top view of a portion of the warehouse system illustrated in FIG. 1.
Figure 4:
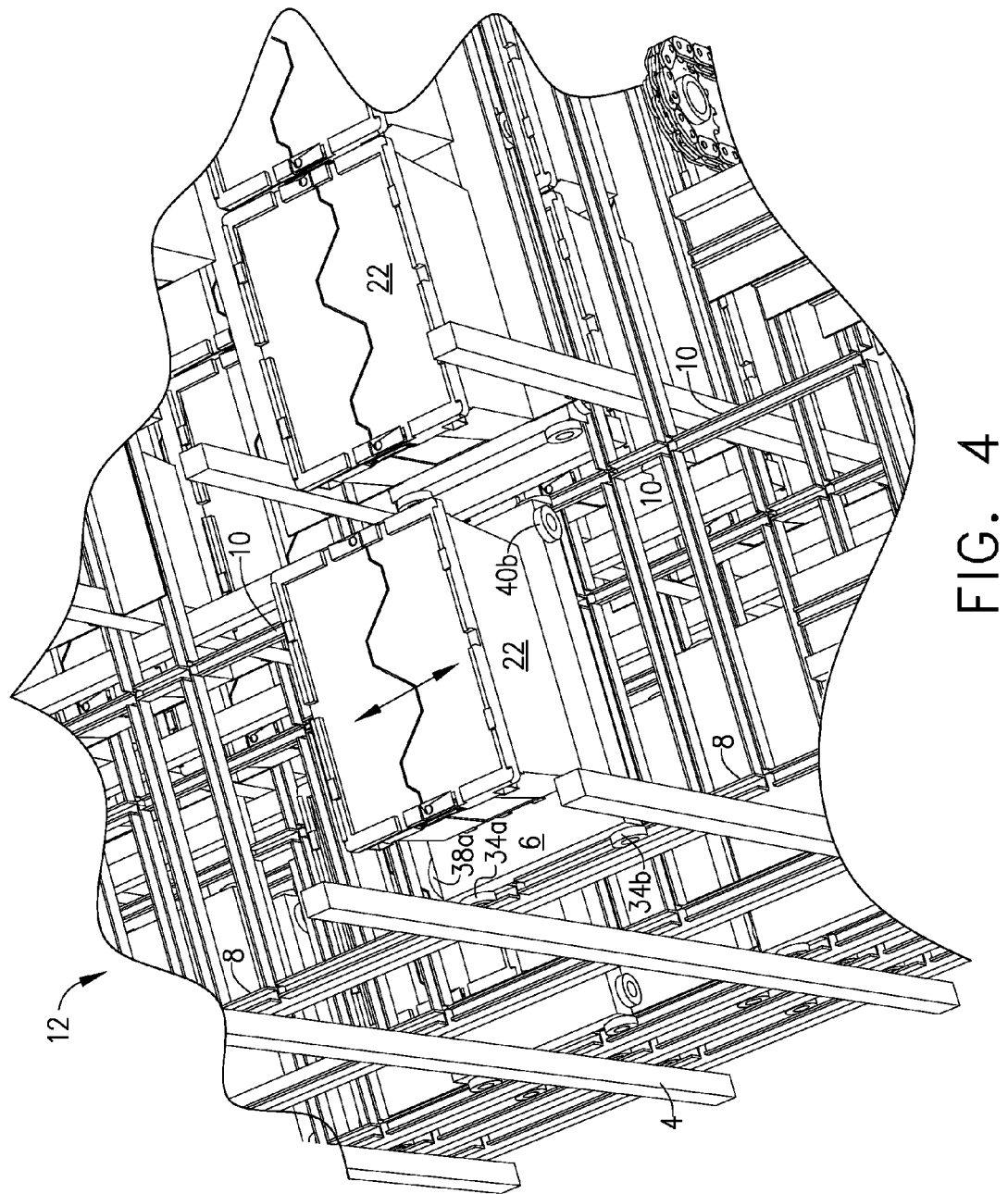
FIG. 4 is a perspective illustration of a cart conveying a container.
Figure 5:
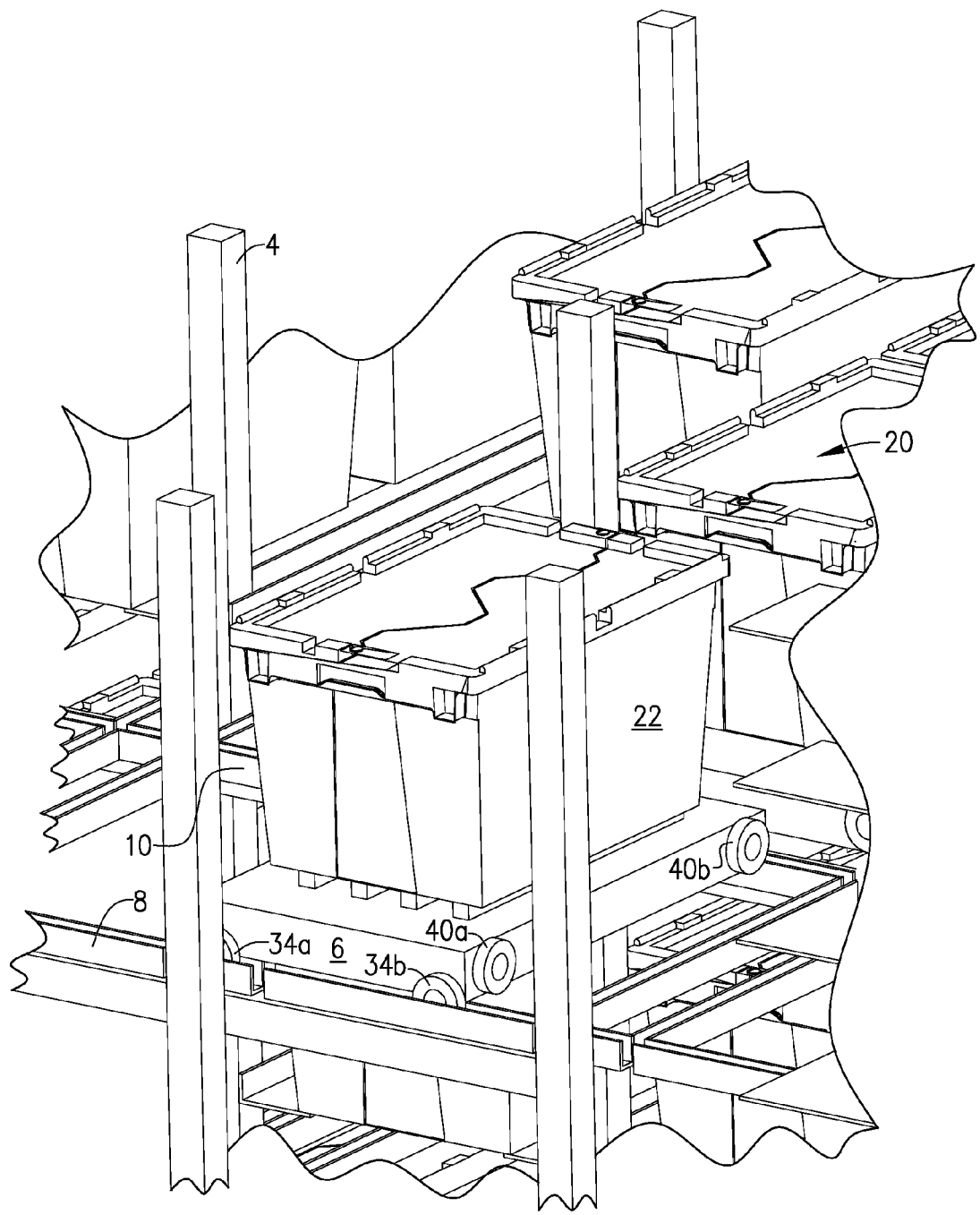
FIG. 5 is a perspective illustration of the cart of FIG. 4.

Reference will now be made in detail to one or more embodiments illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. References herein to a x and y direction are only to provide reference directions to aid in the description and are not to be construed as features or aspects of the invention.

Referring to FIGS. 1-6, there is shown a three dimensional warehouse system, generally indicated at 2, having frame 4 which defines a multi level grid of paths and a plurality of mobile moveable platforms 6, also referred to herein as carts or shuttles, which are controlled to move throughout the grid. Frame 4 includes a plurality of spaced apart rails 8 and 10 extending in the y direction (see FIG. 2), which collectively define a plurality of paths 12 along which carts 6 may travel. Frame 4 also includes a plurality of spaced apart rails 14 and 16 extending in the x direction (see FIG. 2), which collectively define a plurality of paths 18 along which carts 6 may also travel. As described below, a plurality of x direction paths 18a run under storage areas 20 where containers 22, also referred to as totes, are stored. Warehouse system 2 includes a plurality of container storage levels 24a, 24b, 24c, and may include a plurality of cart storage levels 26a, 26b, where carts may be stored during periods of low demand, or stored for charging, such as by a contactless charger, or automated battery exchange. Elevator 28 is configured to move carts 6 between the various levels, with or without containers. Thus, elevator 28 defines paths for carts 6 to travel long between locations on different levels. Although the embodiment illustrated is limited in size, with only three levels 24a, 24b, 24c, and only five rows of storage areas 20, warehouse system 2 may have any suitable number of levels, storage areas and x and y direction paths.

Warehouse system 2 includes controller 30 which executes software instructions to implement the control logic which operates the system. Controller 30 may be programmed to control movements of carts 6, or carts 6 may include a processing system which receives instructions from controller 30 and executes software instructions to control its movement and operation. Carts 6 may locate themselves in any suitable way, such as through a local positioning system, through location markers in system 2, or distance and direction tracking. Controller 30 may communicate with carts 6 directly or indirectly, and with other processing systems of warehouse system 2 in any suitable manner, such as by wireless communication, wired, or IR.

Figure 6:
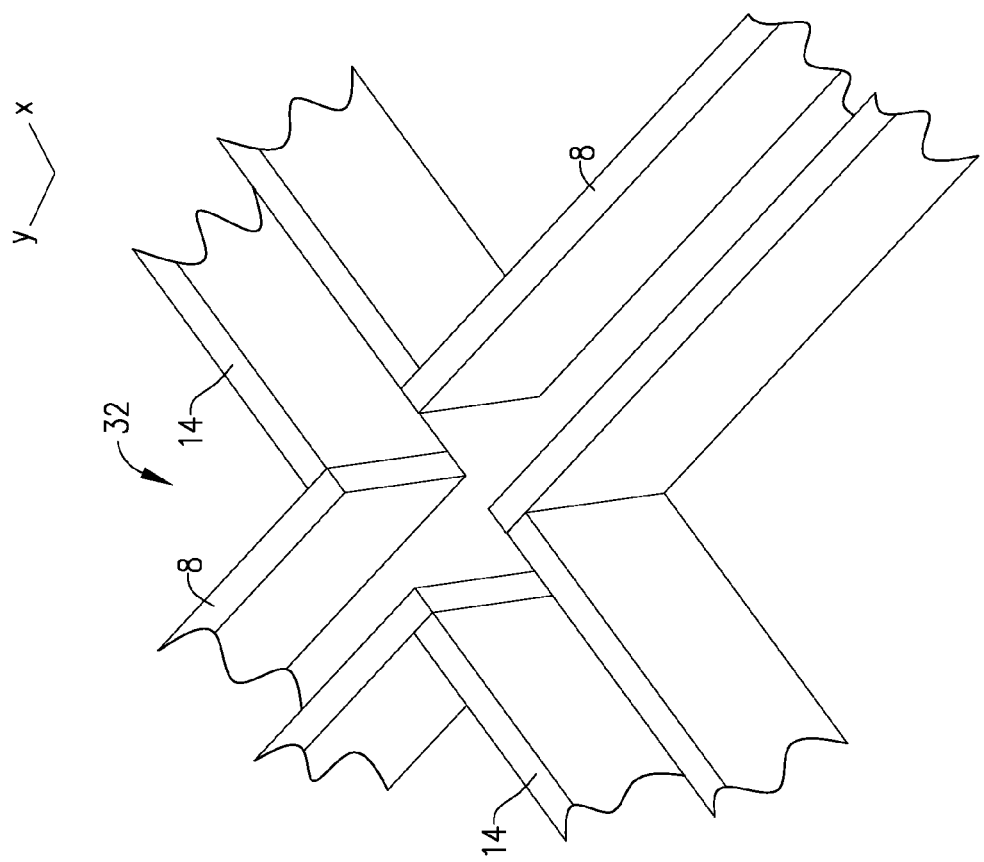
FIG. 6 is a perspective illustration of an intersection of the non-captive rail system of the warehouse system illustrated in FIG. 1.

FIG. 6 illustrates an a typical intersection of tracks. Illustrated is exemplary intersection 32, of one of tracks 8 and one of tracks 14. As can be seen, the tracks are configured as a channel, sized and shaped to receive and guide wheels carried of carts 6. Tracks 8, 10, 14, 16 may be of any suitable shape for supporting and guiding carts 6, such as a L cross sectional shape. As seen in FIGS. 4, 5, 7 and 8, carts 6 include a plurality of wheels. Spaced apart wheels 34a and 34b are arranged along a first side of cart 6, configured to engage tracks 8. Spaced apart wheels 36a and 36b are arranged along a second side of cart 6 opposite the first side, configured to engage tracks 10. Wheels 34a, 34b, 36a, 36b comprise a first set which support cart 6 for movement in the y direction. Similarly, spaced apart wheels 38a and 38b are arranged along a third side of cart 6, configured to engage tracks 14, and spaced apart wheels 40a and 40b are arranged along a fourth side of cart 6 opposite the third side, configured to engage tracks 16. Wheels 38a, 38b, 40a, 40b comprise a second set which support cart 6 for movement in the x direction.

Both the first and second wheel sets are selectively rotationally driven clockwise or counterclockwise by a power source (not seen) carried by cart 6 to advance cart 6 in the y direction or the x direction, respectively. Each wheel set is also selectively vertically moveable by the cart power source. During movement in the y direction, the second wheel set is in the up position so that the second wheel set does not engage either track 14 or 16. Similarly, during movement in the x direction, the first wheel set is in the up position so that the first wheel set does not engage either track 8 or 10. This allows cart 6 to move in the desired direction past the intersections. When the direction of the cart is to be changed from the x direction to the y direction, the high wheel set is lowered and the low wheel set is raised, which can occur simultaneously or sequentially. As will be appreciated, the change indirection may be accomplished with only one wheel set being vertically moveable provided that the lowest position of the vertically moveable set elevates the cart high enough that the other wheel set does not engage its tracks.

Figure 7:
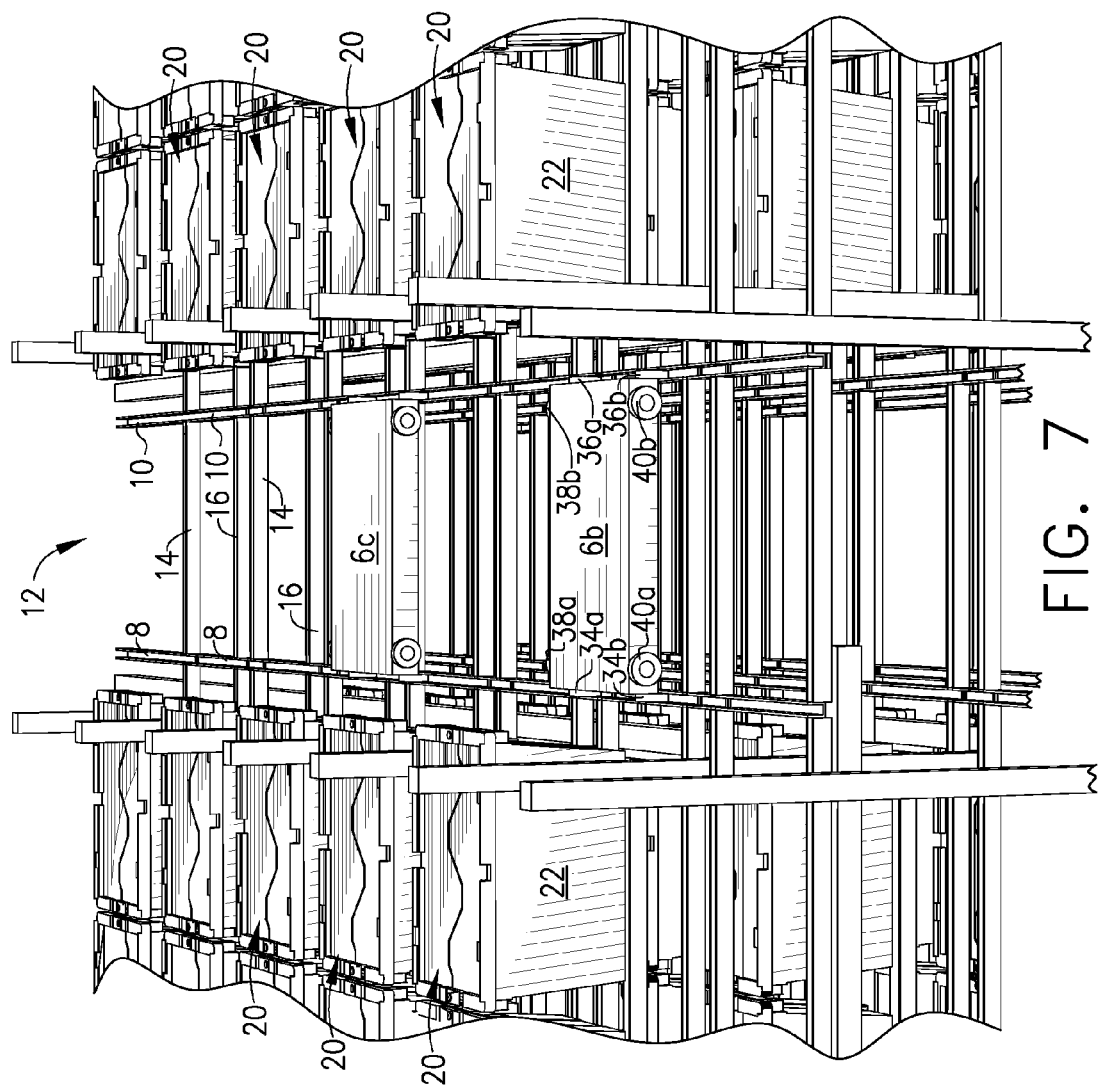
FIG. 7 is a perspective illustration of two carts in a main aisle of the warehouse system of FIG. 1.
Figure 8:
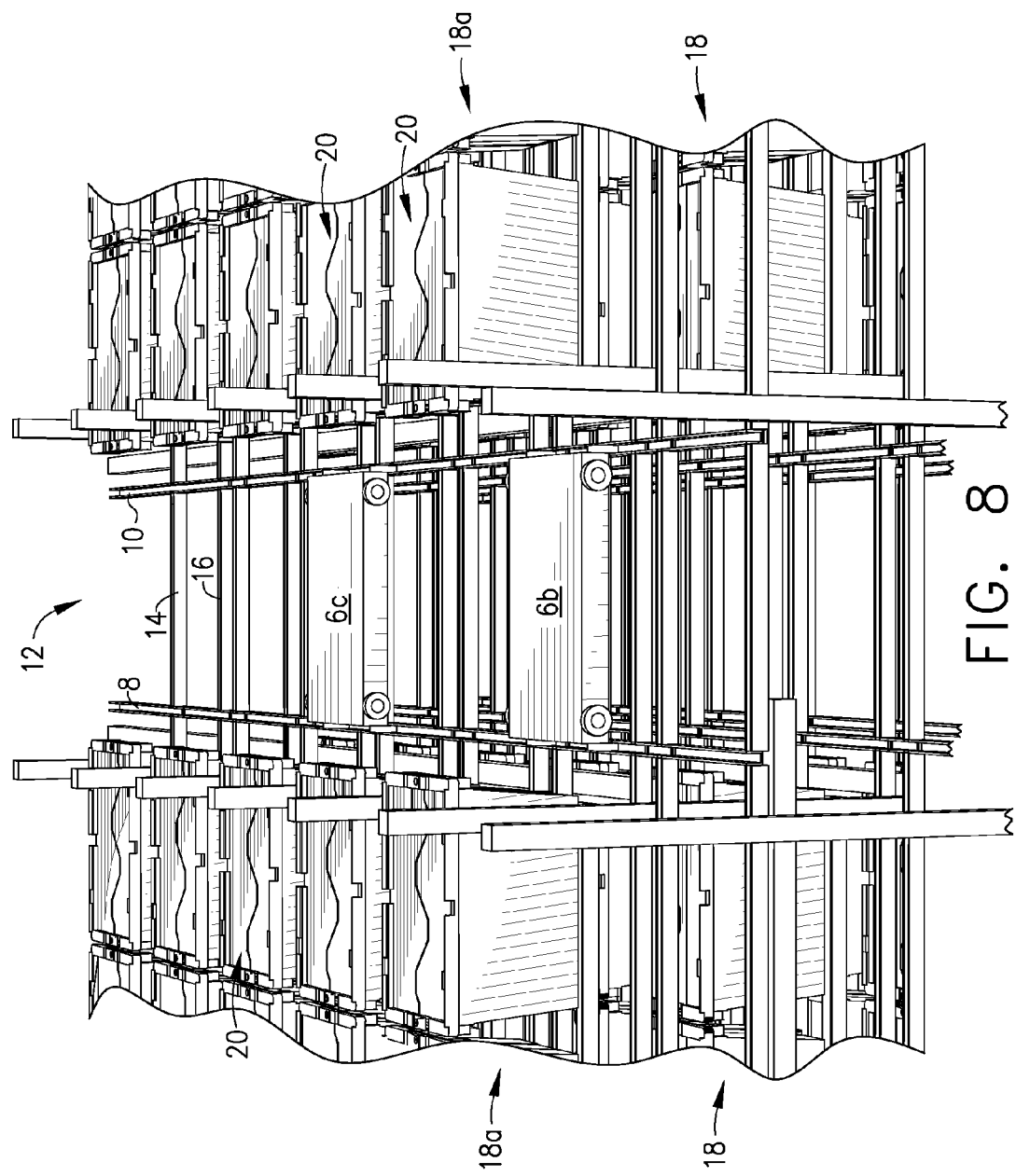
FIG. 8 is a perspective illustration similar to FIG. 7 with surface shading to clarify components of the system.
Figure 9:
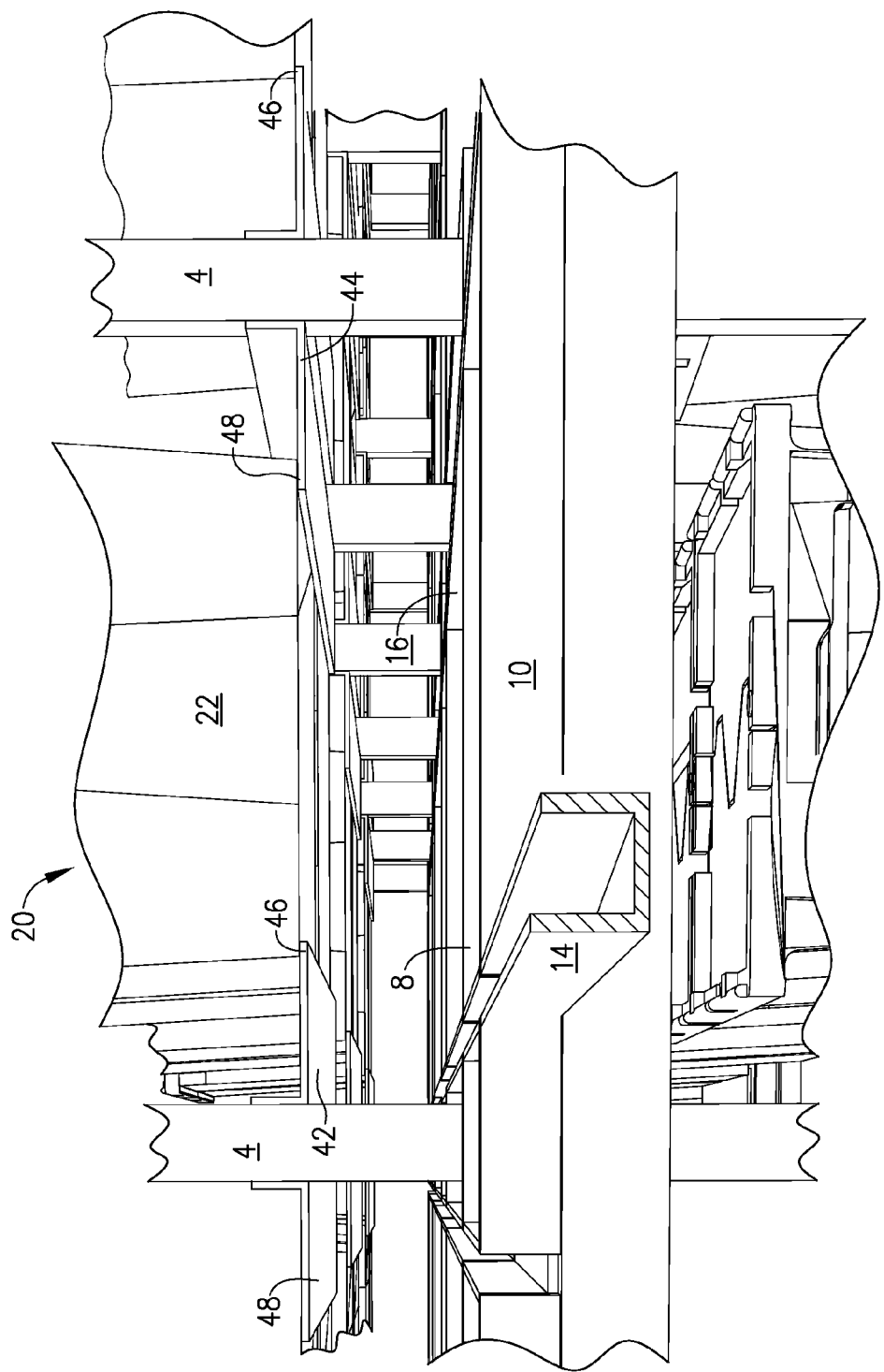
FIG. 9 is a perspective illustration of a container in a storage area.
Figure 10:
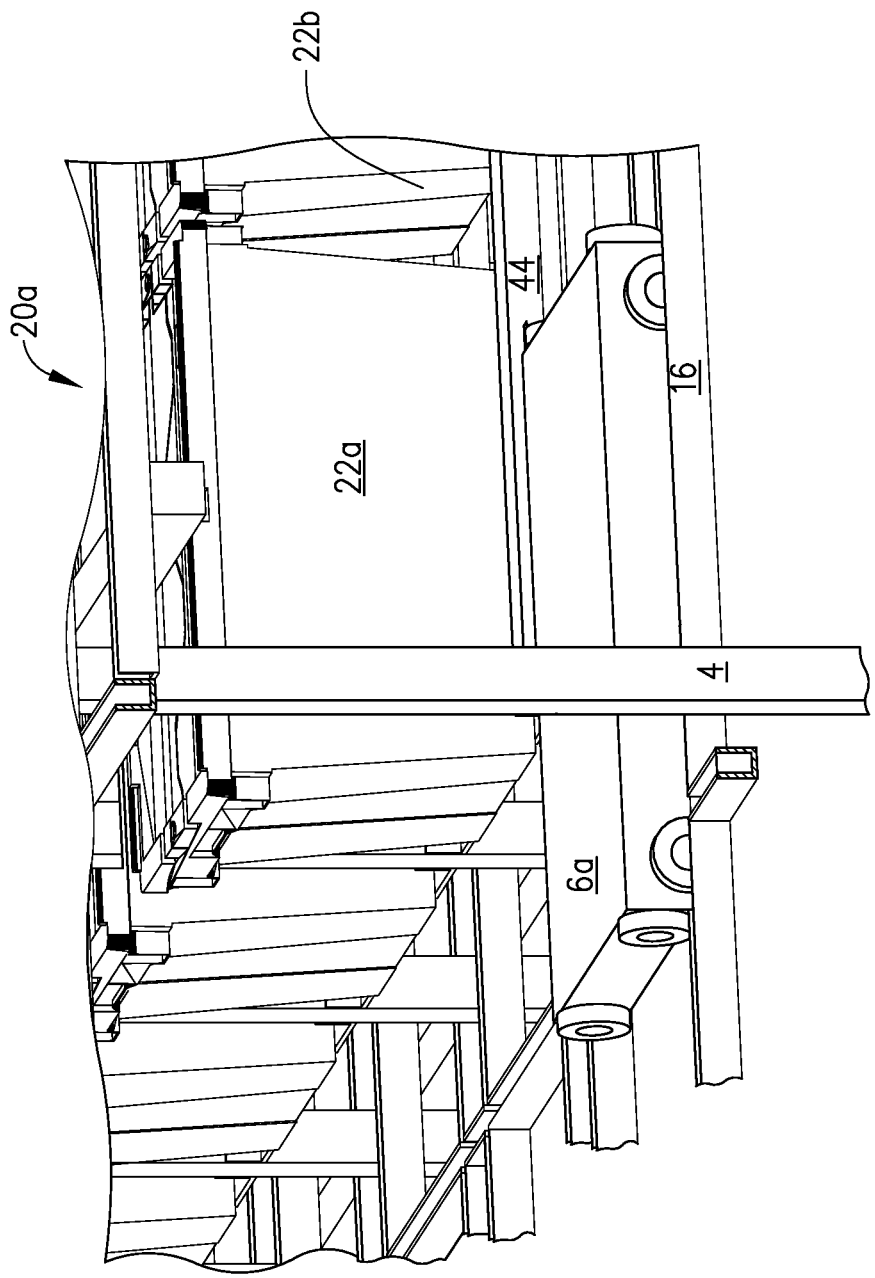
FIG. 10 is a perspective illustration of a cart partially disposed under a container in a storage area.

Referring to FIGS. 7-10, containers 22 may be stored in storage areas 20. As seen in FIG. 9, storage area 20 includes spaced apart supports 42 and 44, which engage container 22 at areas 46 and 48, leaving an open area therebetween overlying the paths 18a under storage areas 20 sufficient to allow carts 6 to travel along the paths 18a without being impeded by containers 22 or articles held or supported by storage areas 20. To retrieve containers 22 in respective storage areas 20, empty carts 6 travel along paths 18a from a main aisle path 12 to a position in storage area 20 underlying the container to be retrieved. FIG. 10 illustrates cart 6a moving into storage area 20a to retrieve container 22a. Once under container 22a, cart 6a is out of the main aisle path 12, leaving main aisle path 12 open for other carts 6 to travel along while cart 6a is retrieving or storing container 22a. When cart 6a is under container 22a, a lifting mechanism (described below) of cart 6a will raise, engage container 22a and lift it out of engagement with supports 42 and 44. Cart 6a then moves along path 18a to retrieve container 22a, either in the opposite direction that it entered storage area 20a from, or if there is not a container in the storage area adjacent storage area 20a, continuing in the same direction carrying container 22a. If adjacent container 22b is to be retrieved by cart 6a, cart 6a could travel under and past container 22a and stop below container 22b, then retrieve it in the same described manner. Storing a container in storage areas 20 may be done in the reverse order, lowering containers 22 onto supports 42 and 44.

Although containers 22 are illustrated, individual articles not in containers may also be stored in and retrieved from storage areas 20 in the same way, with supports 46 and 48 configured complementary to the specific article's physical characteristics. The lifting mechanisms of carts 6 may have individually actuatable elements such that the effective width or length of the lifting mechanism can be controlled to match the article. A large article may occupy a storage area larger than that occupied by a single container.

This configuration of warehouse system 2 also improves the efficiency and response time in retrieving and storing containers or articles. FIGS. 7 and 8 illustrate carts 6b and 6c in the same main aisle path 12. In the illustrated position, cart 6c is impeding or blocking cart 6b's movement along path 12 the direction toward the top of FIG. 8. In such a case, cart 6c may be directed to move from main aisle path 12, into a storage area 20 along a path 18a, until cart 6b has passed. This avoids routing either cart 6b or 6c along less direct paths, providing improved efficiency and speed.

Figure 11:
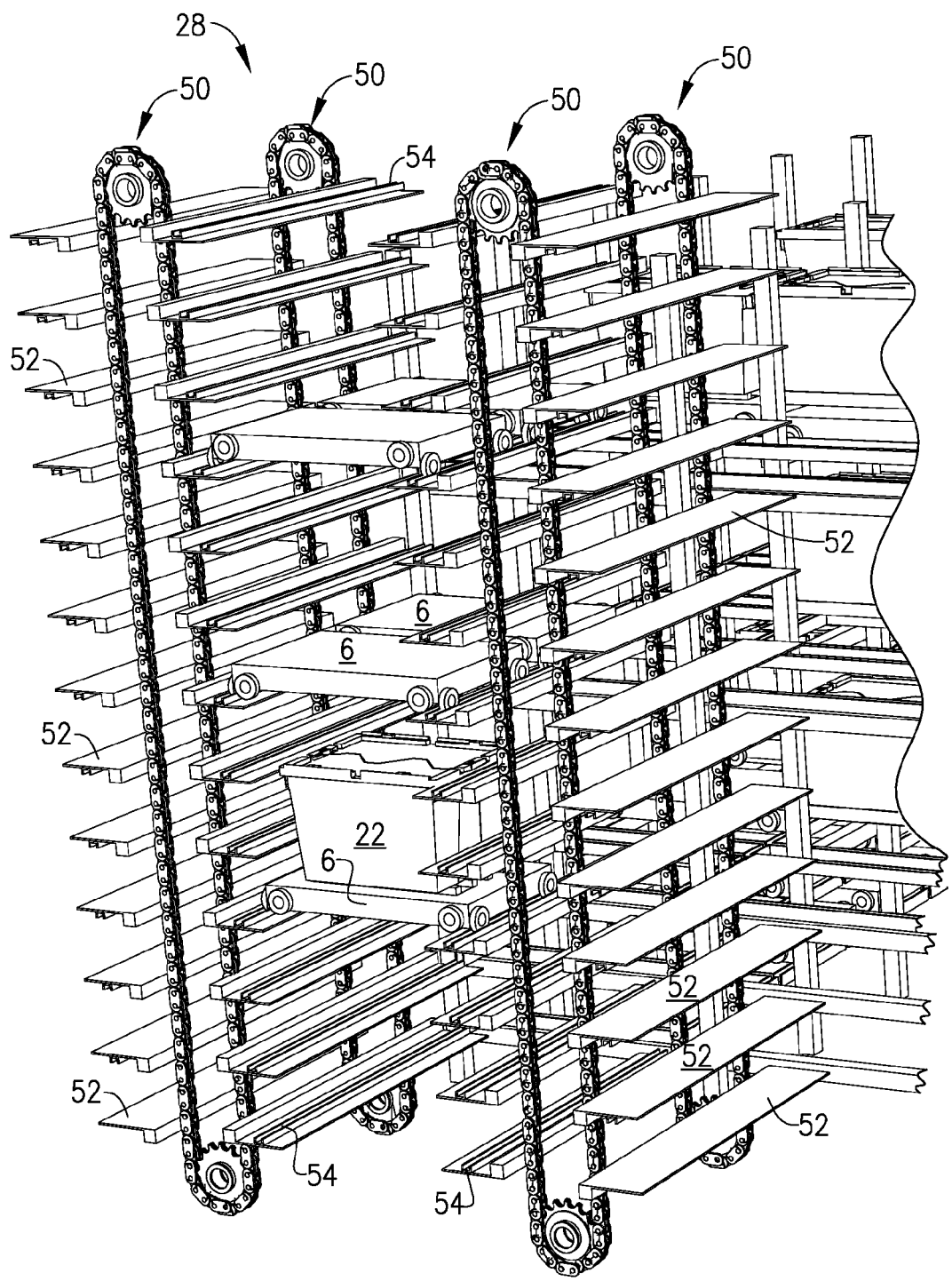
FIG. 11 is a perspective illustration of the cart elevator system of the warehouse system of FIG. 1.

FIG. 11 illustrates elevator 28 which is configured to move carts 6 between levels. Any suitable lifting/lowering mechanism may be used, such as the diagrammatically illustrated chain and sprocket arrangement 50. A plurality of spaced apart supports 52 include tracks 54 configured to receive a wheel set of carts 6. In the embodiment depicted, supports 52 are sized to hold two carts 6, but any suitable size may be used. Elevator may be configured to convey carts 6 up or down, or an up elevator and down elevator may be provided. Elevator may be controlled in any suitable manner, such as locally by a dedicated elevator controller.

Figure 12:
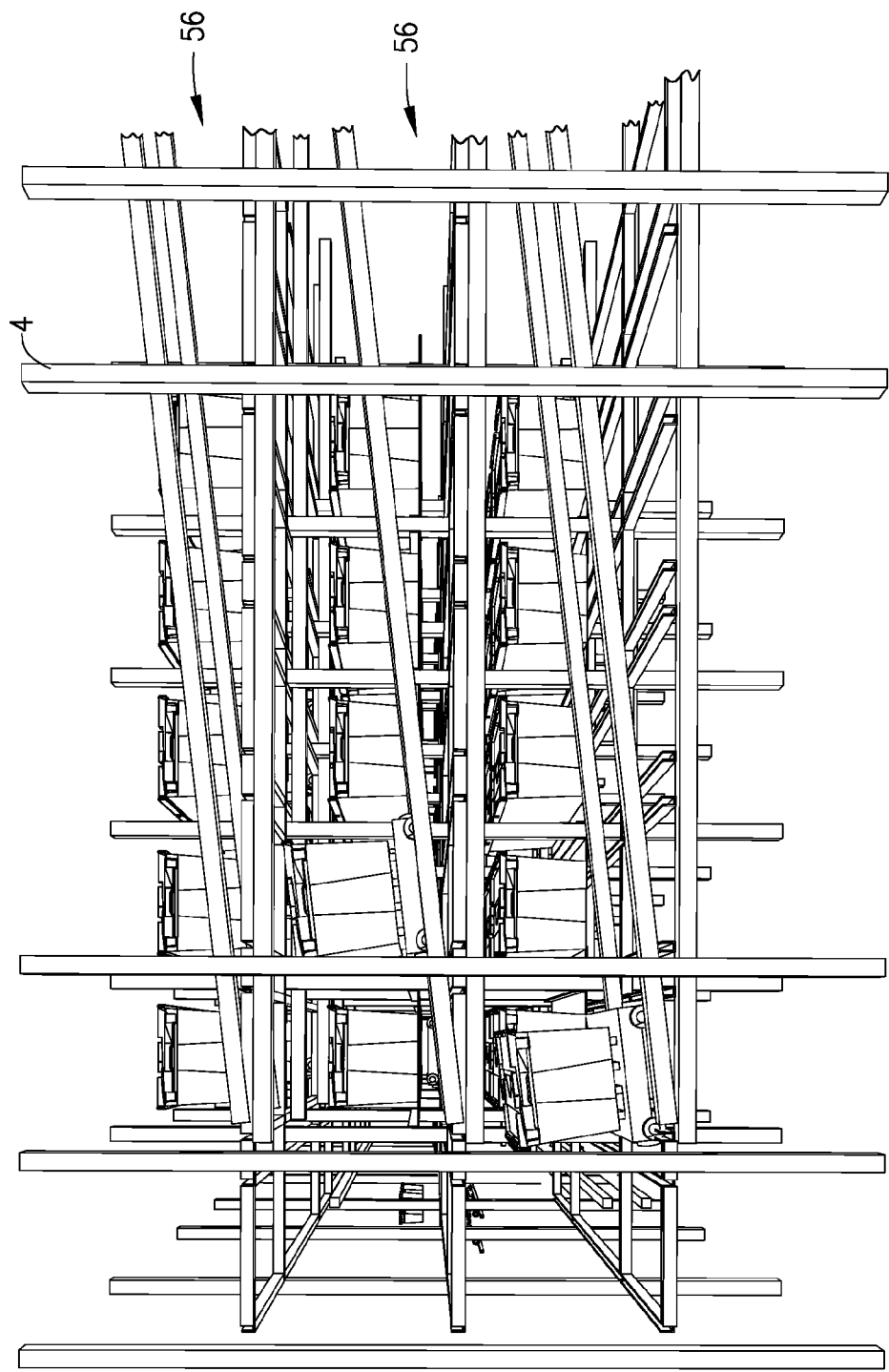
FIG. 12 is a perspective illustration of inclined ramps usable in the warehouse system of FIG. 1.

FIG. 12 illustrates inclined paths 56, allowing carts 6 to change levels under their own power.

Figure 13:
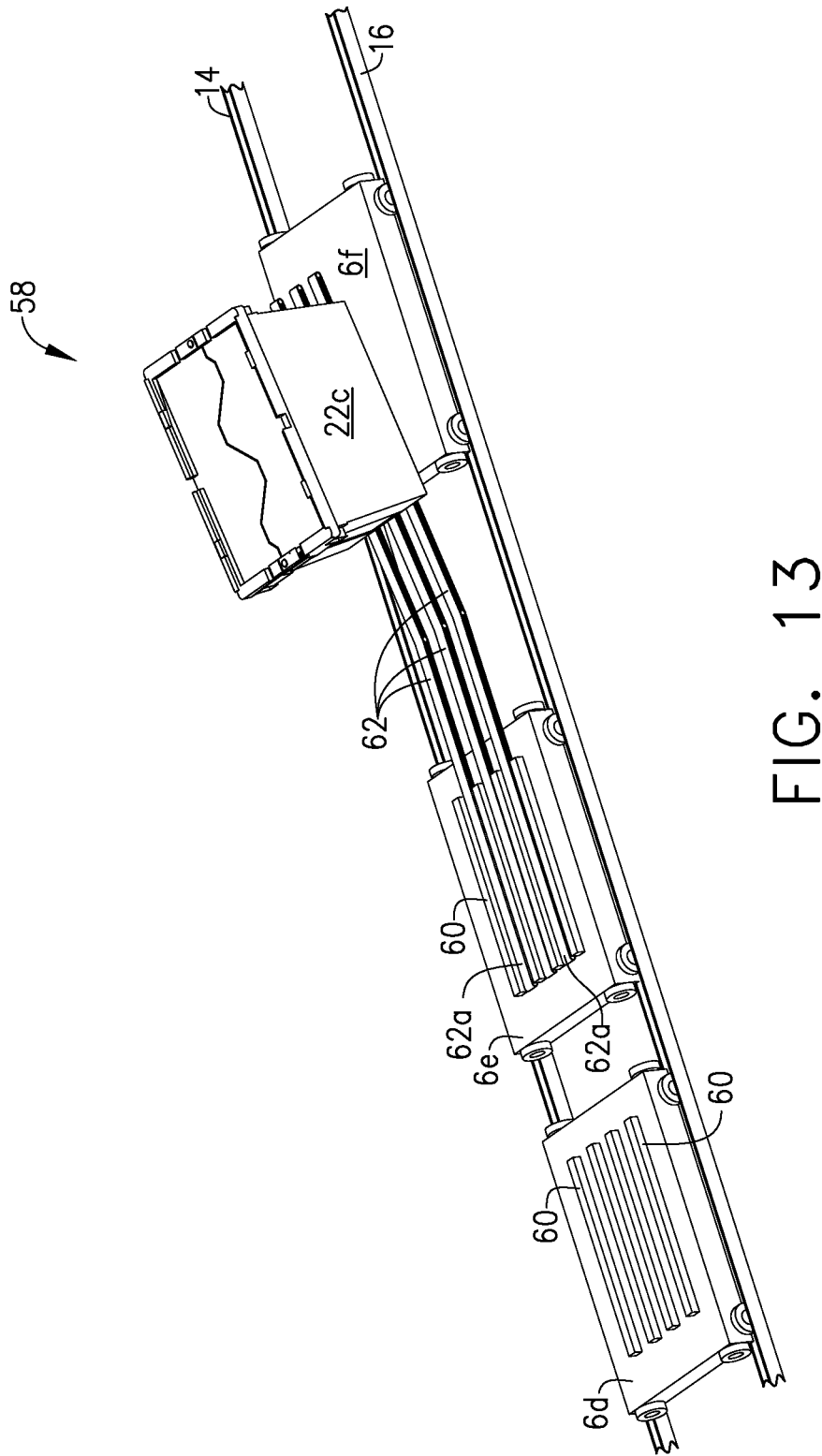
FIG. 13 is a perspective illustration of a transfer station for removing or placing containers onto carts and into the warehouse system.
Figure 14:
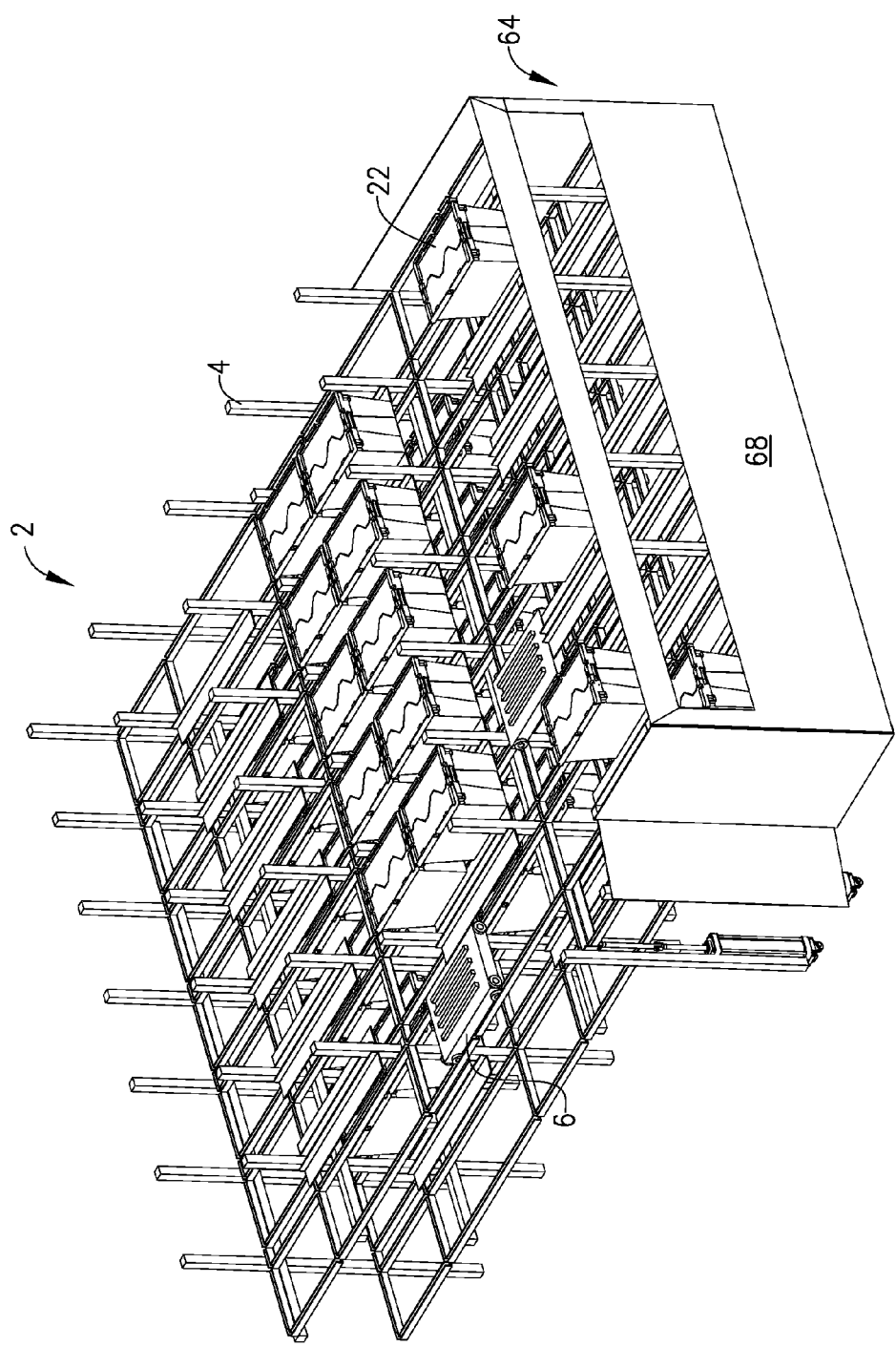
FIG. 14 is a perspective illustration of a system constructed in accordance with one or more teachings of the present invention as a goods to operator system.
Figure 15:
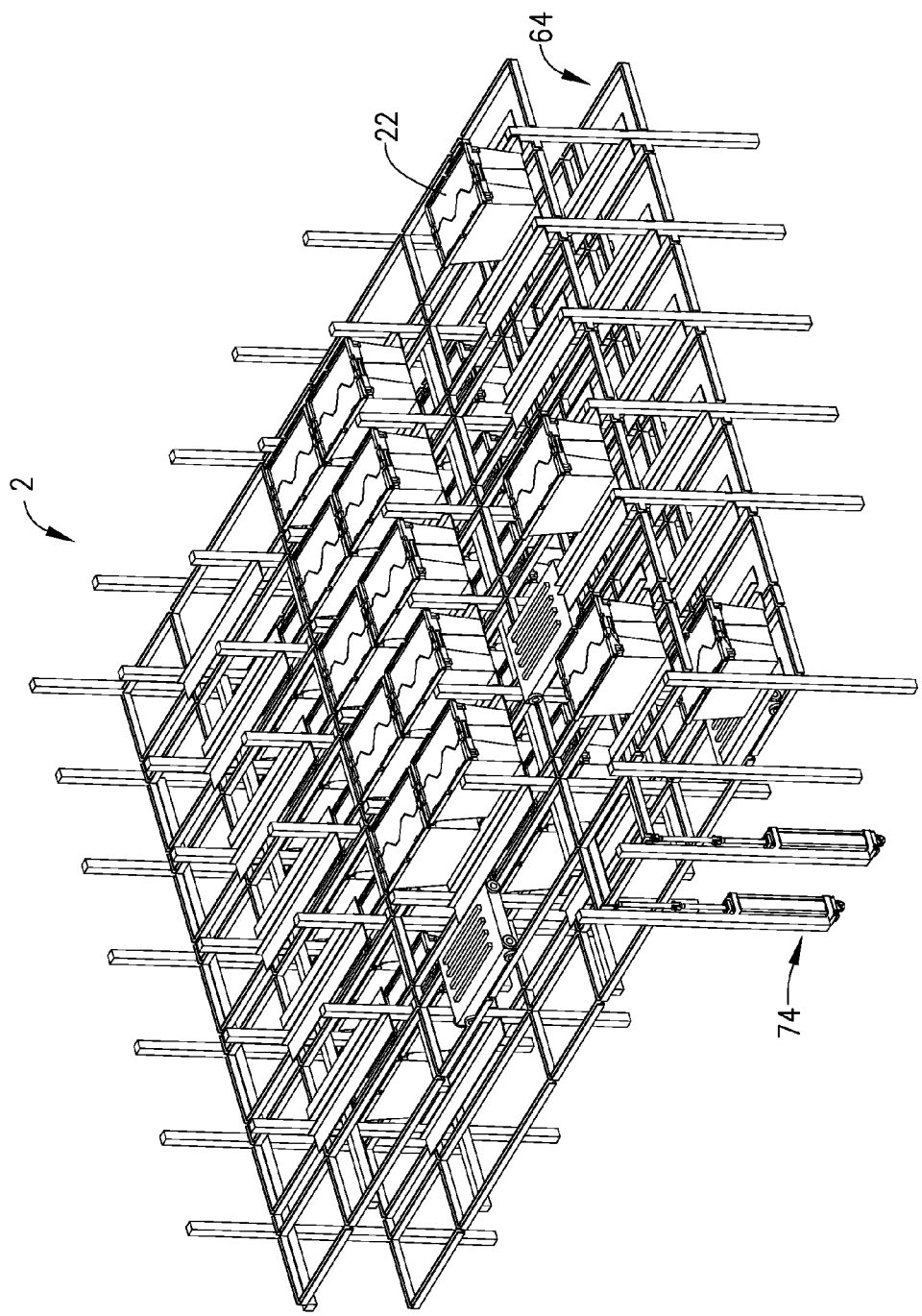
FIG. 15 is a perspective view of the system of FIG. 14 with the cover panels of the operator interface omitted for clarity.
Figure 16:
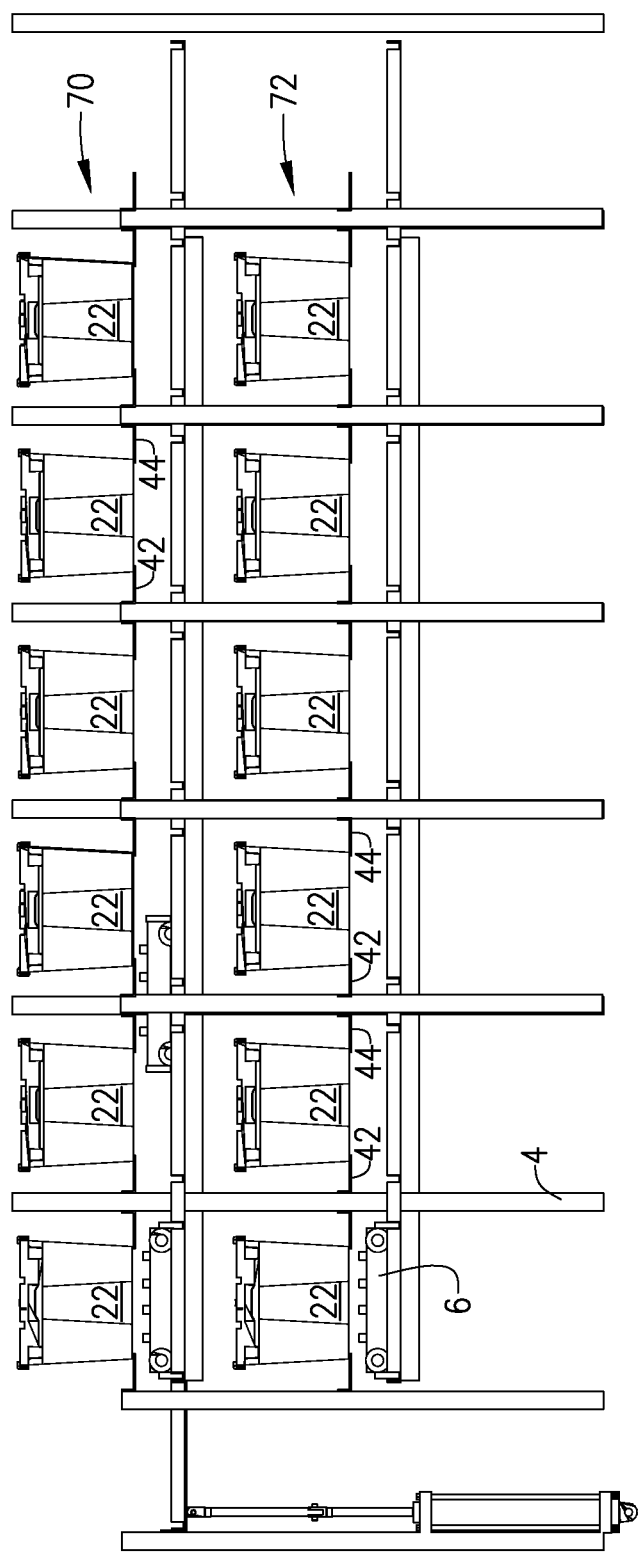
FIG. 16 is a front view of the system of FIG. 14 with the cover panels of the operator interface omitted for clarity.
Figure 17:
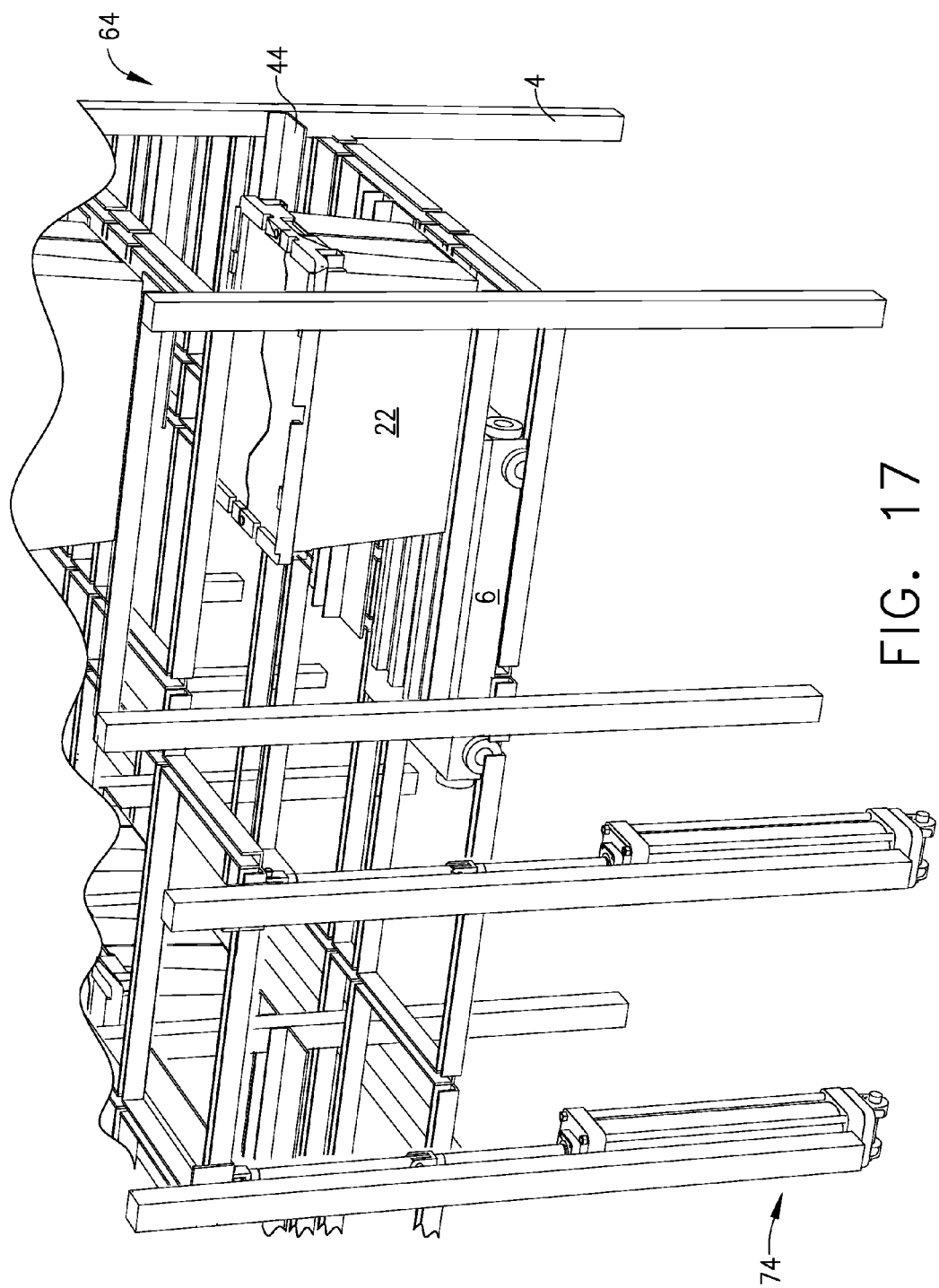
FIG. 17 is a perspective illustration of a portion of the system of FIG. 14 showing containers at the operator interface and the lift.
Figure 18:
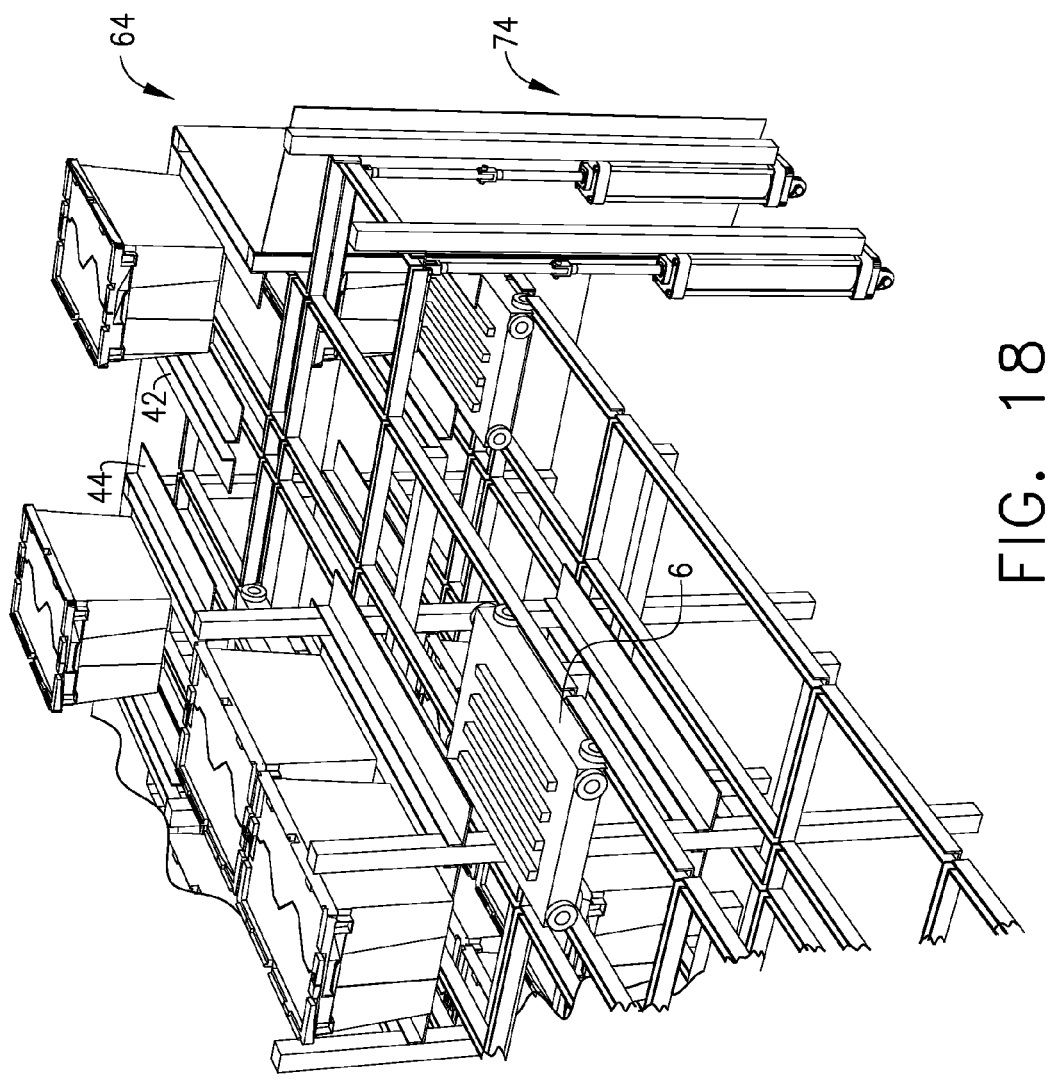
FIG. 18 is a perspective illustration from the rear side of the same portion of the system of FIG. 14 shown in FIG. 17.

Introduction into or removal of containers or articles from system 2 may be manual or automatic. FIG. 13 illustrates transfer station 58, by which containers or articles may be directed into or out of warehouse system 2. One or more transfer stations may be located at any suitable location. Carts 6d and 6e are illustrated with spaced apart raised lift elements

60. A plurality of conveyor elements 62 are illustrated disposed with end portions 62a aligned with and disposed in the spaces between lift elements 60 of cart 6e. A container or article (omitted for clarity) carried by cart 6e would be engaged by conveyor elements 62 as cart 6e advanced, with the container or article eventually being transferred to conveyor elements 62, as shown for container 22c which has been transferred from cart 6f. Container 22c can thereafter be directed to a downstream subsystem of the material handling system, such to a merge, a sorter or directly to a loading bay. Carts 6d, 6e and 6f would then return to warehouse system 2 along a suitable path. Similarly, containers may be disposed onto carts with a reverse process.

Alternatively, carts 6 could be directed along paths to carry the containers or articles to their final destination, avoiding the need for merge and sortation systems. Carts would be routed back.

FIGS. 14-18 illustrate operator interface 64 of a goods to operator system as part of warehouse system 2. Warehouse system 2, as described above, can dynamically introduce cartons into and out of operator interface 64. Carts 6 transport containers 22 from storage areas 20 to pick face 68 of operator interface 64. Containers 22 may remain on carts 6, or be transferred by the carts' lifting mechanisms onto supports as described above, and as easily seen in FIGS. 15-18. Ether level, upper level 70 or lower level 72, may serve a pick function and the other level serve a put function, providing pick and put within the same structure, in the same foot print. As described above, carts 6 are not limited to a single level or plane of operation. Lift mechanism 74 is configured and controlled to move carts between upper level 70 and lower level 72. As described above, the storage area which serve operator interface 64 may be of any size and number of levels. Articles from other sources could even be added to containers 22 at operator interface 64 and the containers returned to storages areas 20 within warehouse system 2.

The upper surface of carts 6 may have any suitable configuration. It is noted that different configurations may serve different functions, with the different carts functioning together to achieve the desired conveyance of containers and articles in an efficient manner. Swarm logic might be applied to achieve such functionality.

Figure 19:
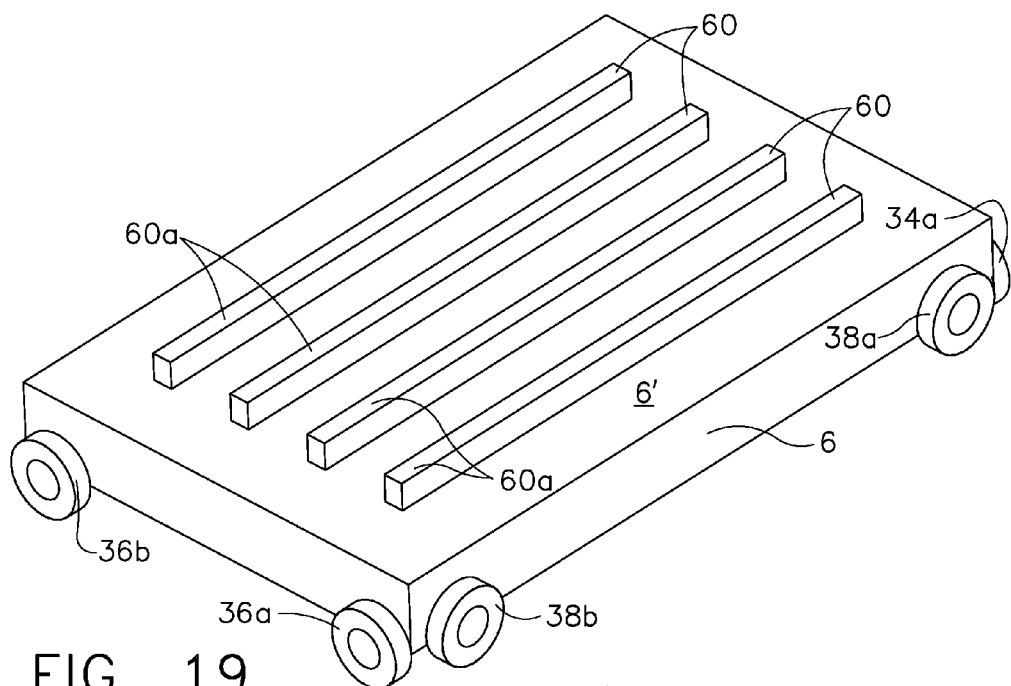
FIG. 19 is a diagrammatic perspective illustration of a cart having a longitudinal lifting mechanism shown in an extended position.

FIGS. 19-30 illustrate various such upper surface configurations. As described above, carts 6 are configured to retrieve and store containers 22 or articles in storage areas 20. Within the teachings herein, each storage area could include a respective lift mechanism for raising and lowering containers 22 or articles from or onto carts. However, carts 6 are illustrated as including lift mechanisms. Referring to FIG. 19, lift elements 60 are diagrammatically illustrated in the raised, extended position. Lift elements 60 extend in a direction referred to herein as longitudinal for ease of description only. Lift elements 60, as are any cart lifts or lift elements described herein, may be driven by the power source carried by cart 6, being raised or lowered on command. Upper surfaces 60a of lift elements 60 may be configured as conveying surfaces capable of conveying containers or articles horizontally in the longitudinal direction. As with the lift elements, any cart conveying surfaces or conveyors may be driven by the power source carried by the cart. Upper surfaces 60a could be configured to remain above the surrounding surface 6' of cart 6, allowing the conveying surfaces to function when lift elements 60 are in the retracted, or lowered, position.

Figure 20:
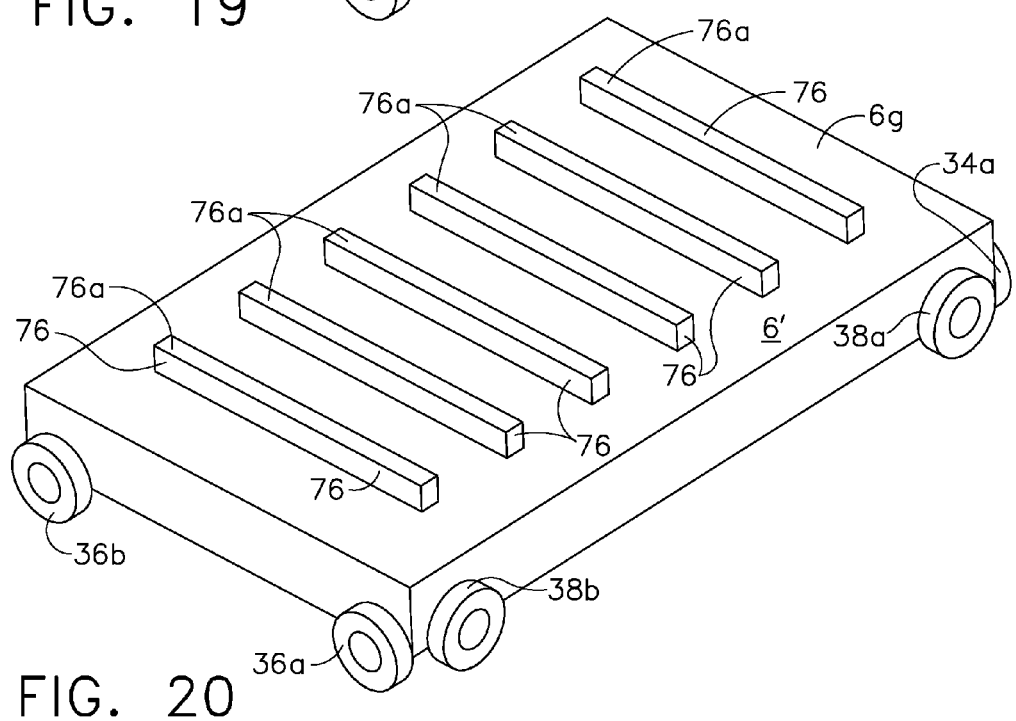
FIG. 20 is a diagrammatic perspective illustration of a cart having a transverse lifting mechanism shown in an extended position.

FIG. 20 diagrammatically illustrate lift elements 76 in the raised, extended position. Lift elements 76 extend in a direction referred to herein as transverse for ease of description only. Upper surfaces 76a of lift elements 76 may be configured as conveying surfaces capable of conveying containers or articles horizontally in the transverse direction. Upper surfaces 76a could be configured to remain above the surrounding surface 6' of cart 6g, allowing the conveying surfaces to function when lift elements 76 are in the retracted, or lowered, position.

Figure 21:
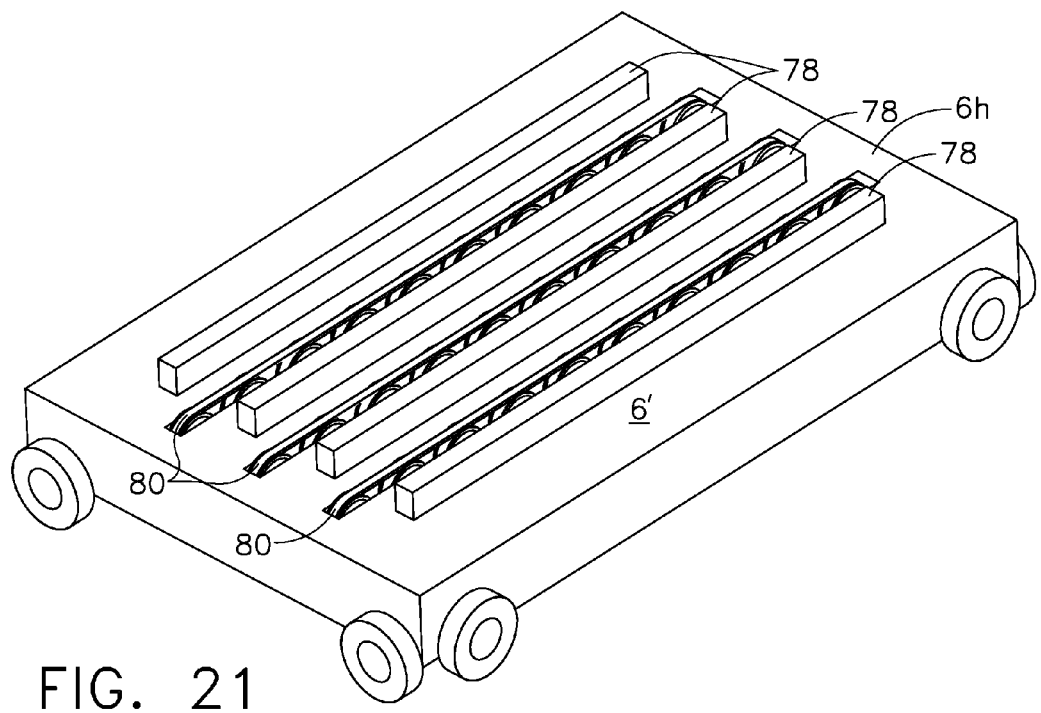
FIG. 21 is a diagrammatic perspective illustration of a cart having a longitudinal lifting mechanism shown in an extended position and a conveyor.
Figure 22:
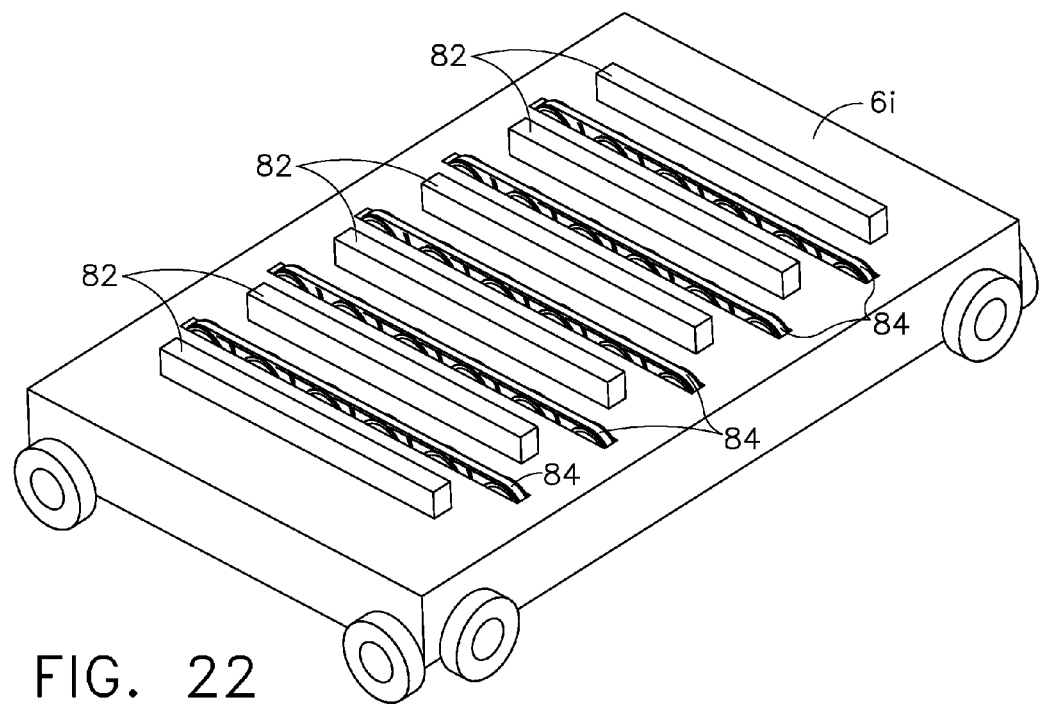
FIG. 22 is a diagrammatic perspective illustration of a cart having a transverse lifting mechanism shown in an extended position and a conveyor.

FIG. 21 diagrammatically illustrate cart 6h with longitudinal lift elements 78 in the raised, extended position. Interposed between lift elements 78 are conveying elements 80 illustrated as belt conveyors, extending in the longitudinal direction. When lift elements 78 are retracted, containers 22 or articles may engage and be conveyed by conveying elements 80. FIG. 22 is similar to FIG. 21, with cart 6i having transverse lift elements 82 and transverse conveying elements 84, illustrated as belt conveyors.

Figure 23:
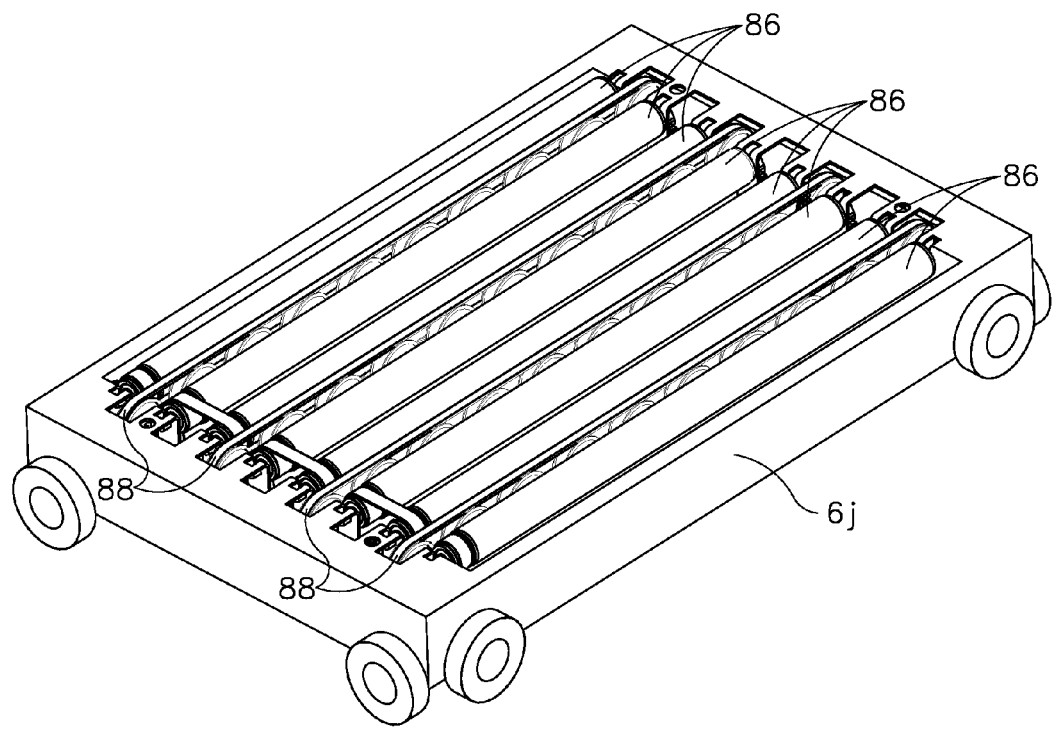
FIG. 23 is a diagrammatic perspective illustration of a cart having a conveyor with rollers and belts extending longitudinally.

FIG. 23 illustrates a plurality of spaced apart rollers 86 disposed longitudinally on cart 6j, configured to convey containers 22 or articles in a transverse direction. A plurality of belt conveyors 88 are interposed between rollers 86, also extending longitudinally but configured to convey containers 22 or articles in a longitudinal direction. As will be appreciated, rollers 86 and belt conveyors 88 are configured similar to a right angle transfer conveyor. Belt conveyors 88 are configured to be moved from a position below rollers 86 to a position above rollers 86, as is necessary to disengage either belt conveyors 88 or rollers 86 from a container 22 or article in order to be able to convey such in the direction of the contacting conveying element. The raised position of belts may be configured to be high enough to lift containers 22 or articles from supports 42, 44.

Figure 24:
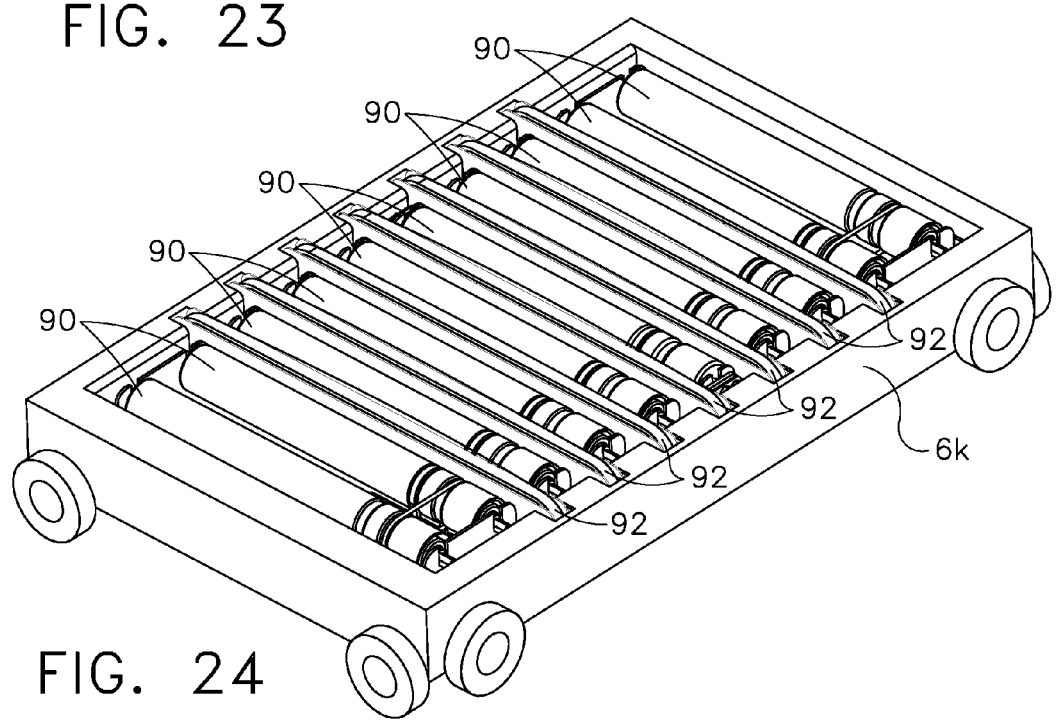
FIG. 24 is a diagrammatic perspective illustration of a cart having a conveyor with rollers and belts extending transversely.

FIG. 24 is similar to FIG. 23, with spaced apart rollers 90 disposed transverse on cart 6k, configured to convey containers 22 or articles in a longitudinal direction. A plurality of belt conveyors 92 are interposed between rollers 90, also extending transverse but configured to convey containers 22 or articles in a transverse direction. Belt conveyors 92 function in the same manner as belt conveyors 88.

Figure 25:
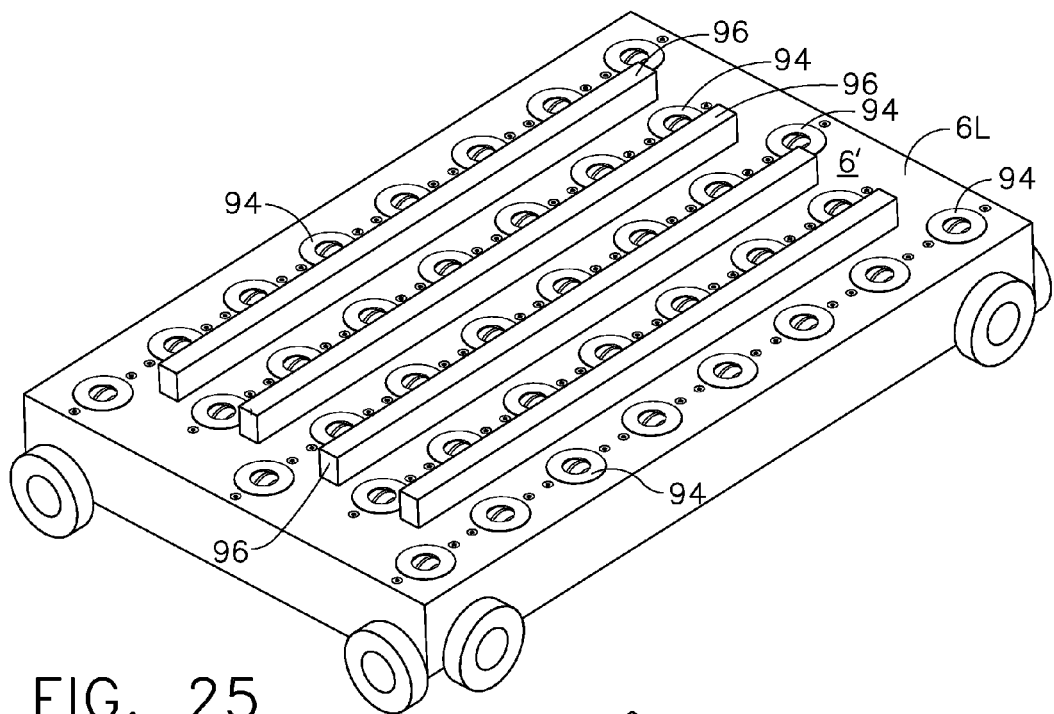
FIG. 25 is a diagrammatic perspective illustration of a cart having a longitudinal lift mechanism shown in an extended position and a conveying surface defined by plurality of omni-directional drives.
Figure 26:
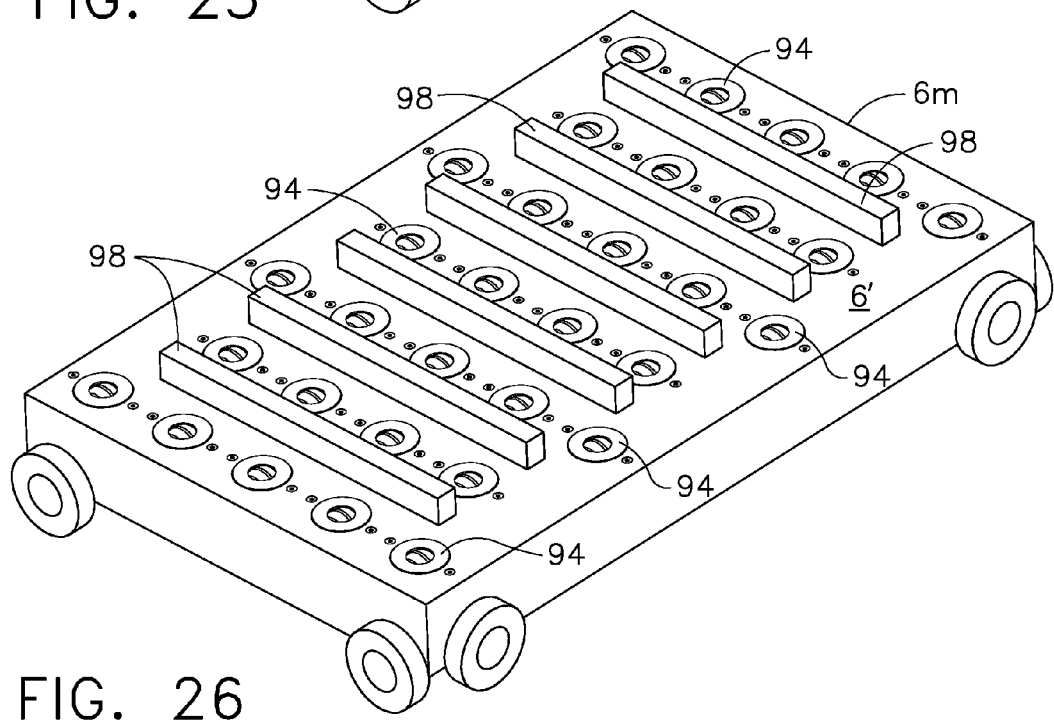
FIG. 26 is a diagrammatic perspective illustration of a cart having a transverse lift mechanism shown in an extended position and a conveying surface defined by plurality of omni-directional drives.
Figure 27:
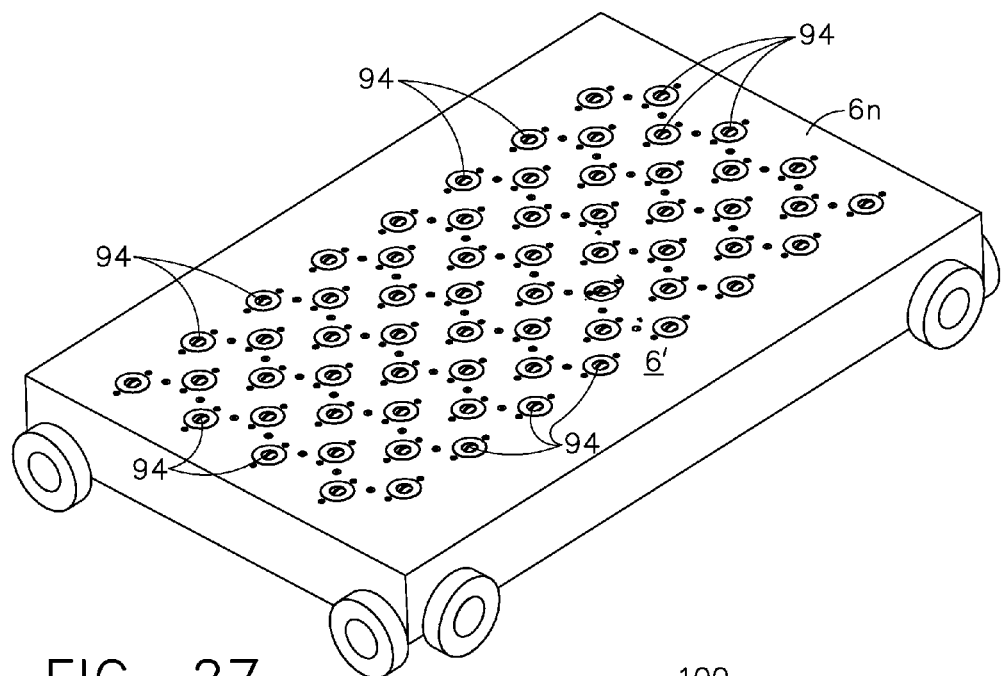
FIG. 27 is a diagrammatic perspective illustration of a cart having a conveying surface defined by plurality of omni-directional drives.

FIGS. 25, 26 and 27 have a plurality of omni-directional drives disposed in an array on surfaces 6'. Cart 6l has a plurality of lift longitudinal lift elements 96. Cart 6m has a plurality of transverse lift elements 98. Cart 6n does not have a lift element, and may serve to transport containers or articles deposited onto it, such as from other carts or by hand.

Figure 28:
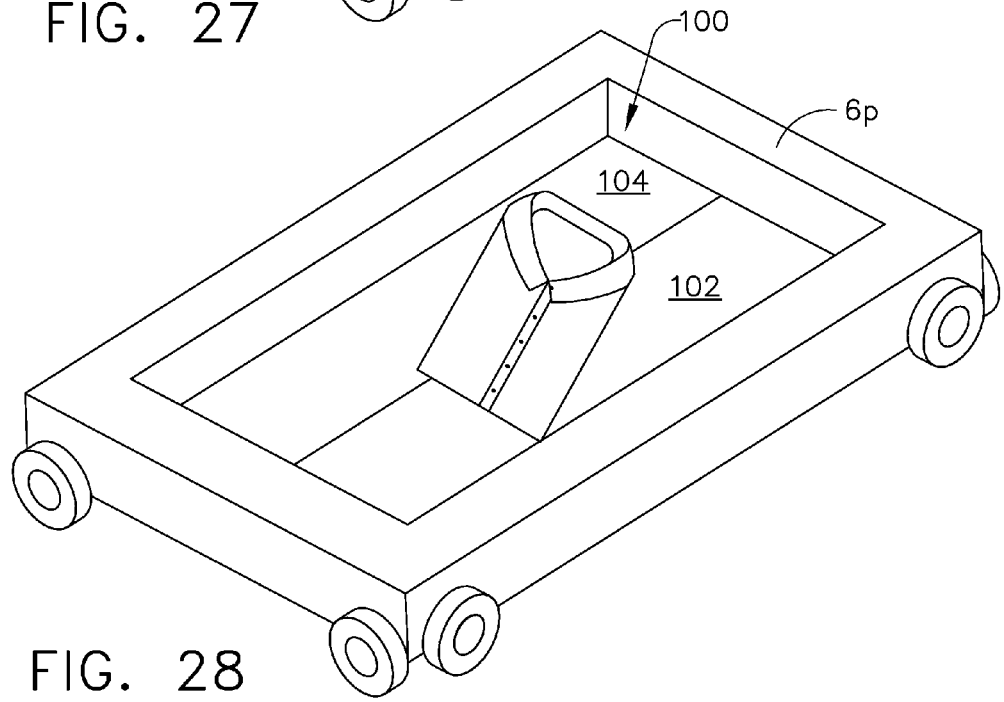
FIG. 28 is a diagrammatic perspective illustration of cart having a "bomb bay" configuration.
Figure 31:
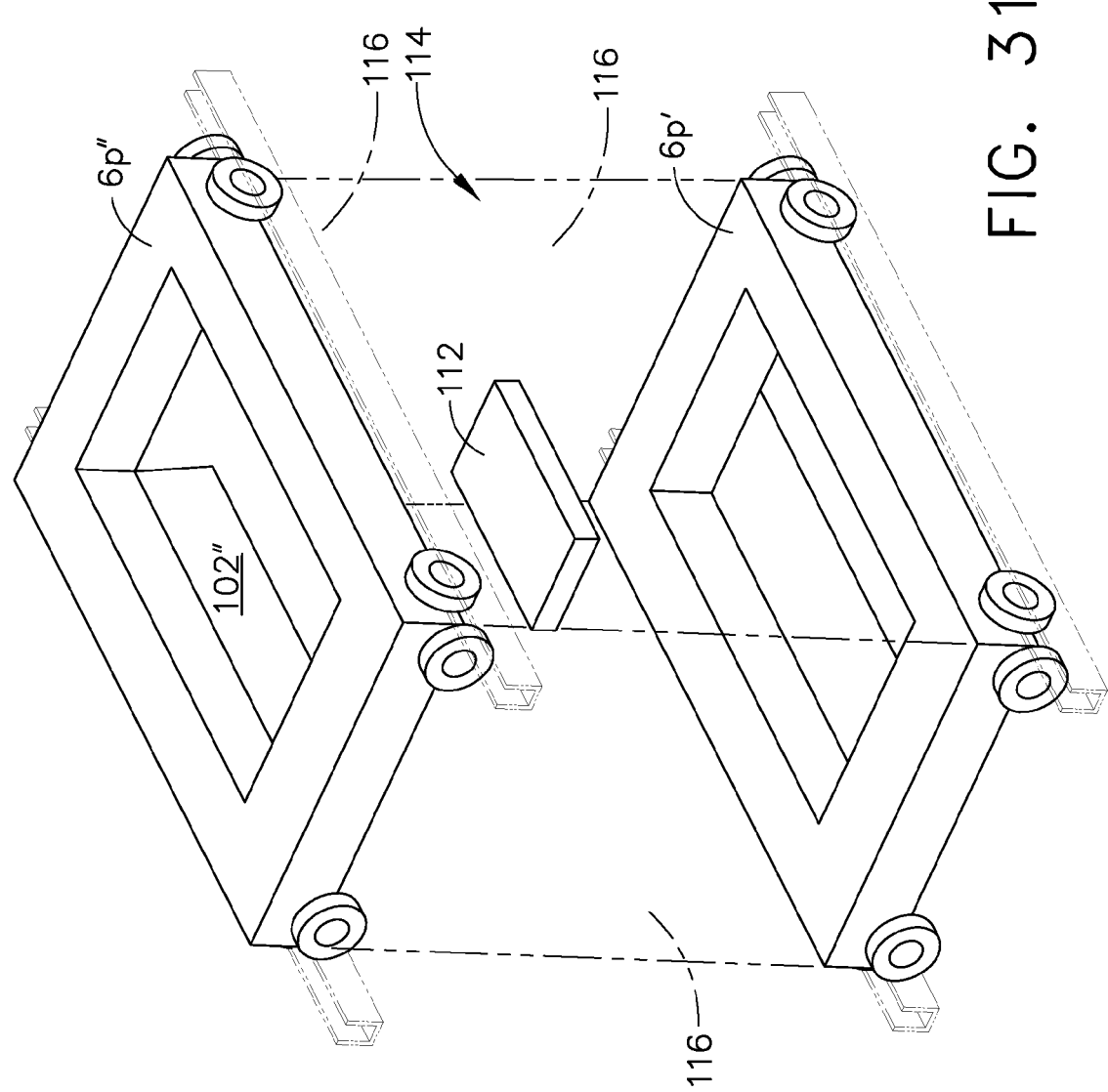
FIG. 31 is a diagrammatic perspective illustration of two carts during a vertical sort or transfer of an article from the upper cart to the lower cart directly below the upper cart.

Cart 6p of FIG. 28 is referred to as a "bomb bay" style cart, having recessed area 100 into which articles may be disposed, such as manually or from other carts. The bottom of recessed area 100 is formed by two rotatable doors 102, 104. Doors 102, 104 are selectively rotatable, upon command from controller 30 or an onboard processor of cart 6p, discharging downwardly any article in recessed area 100. Thus, cart 6p may transfer articles to an underlying location, such as another cart of any configuration, such as a bomb bay style cart, to an underlying container. Referring also to FIG. 31, cart 6p" is illustrated overlying cart 6p', with door 102" open. Article 112 is illustrated in the process of being vertically sorted to underlying cart 6p' at location 114. Such transfer may occur in a predetermined location within warehouse system 2, such as at a designated transfer location that may be configured with a guiding vertical chute, as diagrammatically indicated at 116, or an inclined chute, above a storage location holding the destination container. Such transfer may occur in non-fixed locations, with controller 30 coordinating the paths and locations of the discharging cart and the receiving cart so as to effect the transfer. Thus, cart 6p is capable of serving a sort function, at fixed or mobile sort locations.

Similarly, carts having conveying elements of any configuration, such illustrated in FIGS. 19-27, may serve, in addition to transporting items, a sort function, also at fixed or mobile sort locations. Carts may be disposed adjacent each other on the same level, and the conveying surfaces operation coordinated to transfer containers or articles from one cart to another. Carts 6*l*, 6*m* and 6*n* may transfer articles in any direction, provided other carts are appropriately located and operated in coordination therewith.

Figure 32:
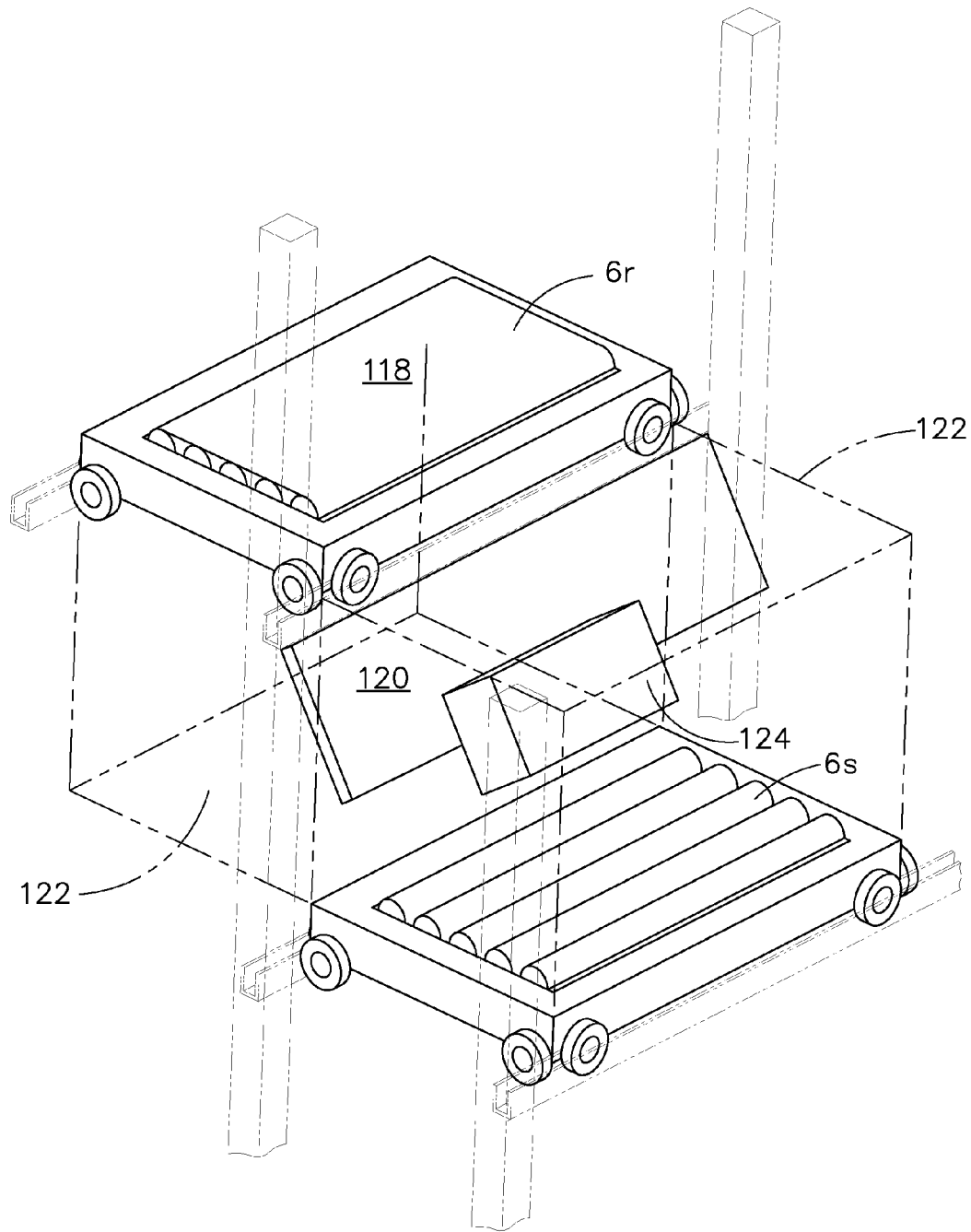
FIG. 32 is a diagrammatic perspective illustration of two carts during a vertical sort or transfer of an article from the upper cart to the lower cart which is located below and to the side of the upper cart.

Carts having conveying elements of any configuration, such illustrated in FIGS. 19-27, may also sort items vertically off of its side, to a lower level receiving cart or container. Chutes or inclines may be necessary to ensure such articles reach the intended location. FIG. 32 illustrates cart 6*r*, having belt conveyor 118 disposed on its upper surface. One level down and offset to a side, cart 6*s* is disposed to receive item 124, which is illustrated as having just slide off of inclined chute 120, bounded at the ends by chute walls 122.

Figure 33:
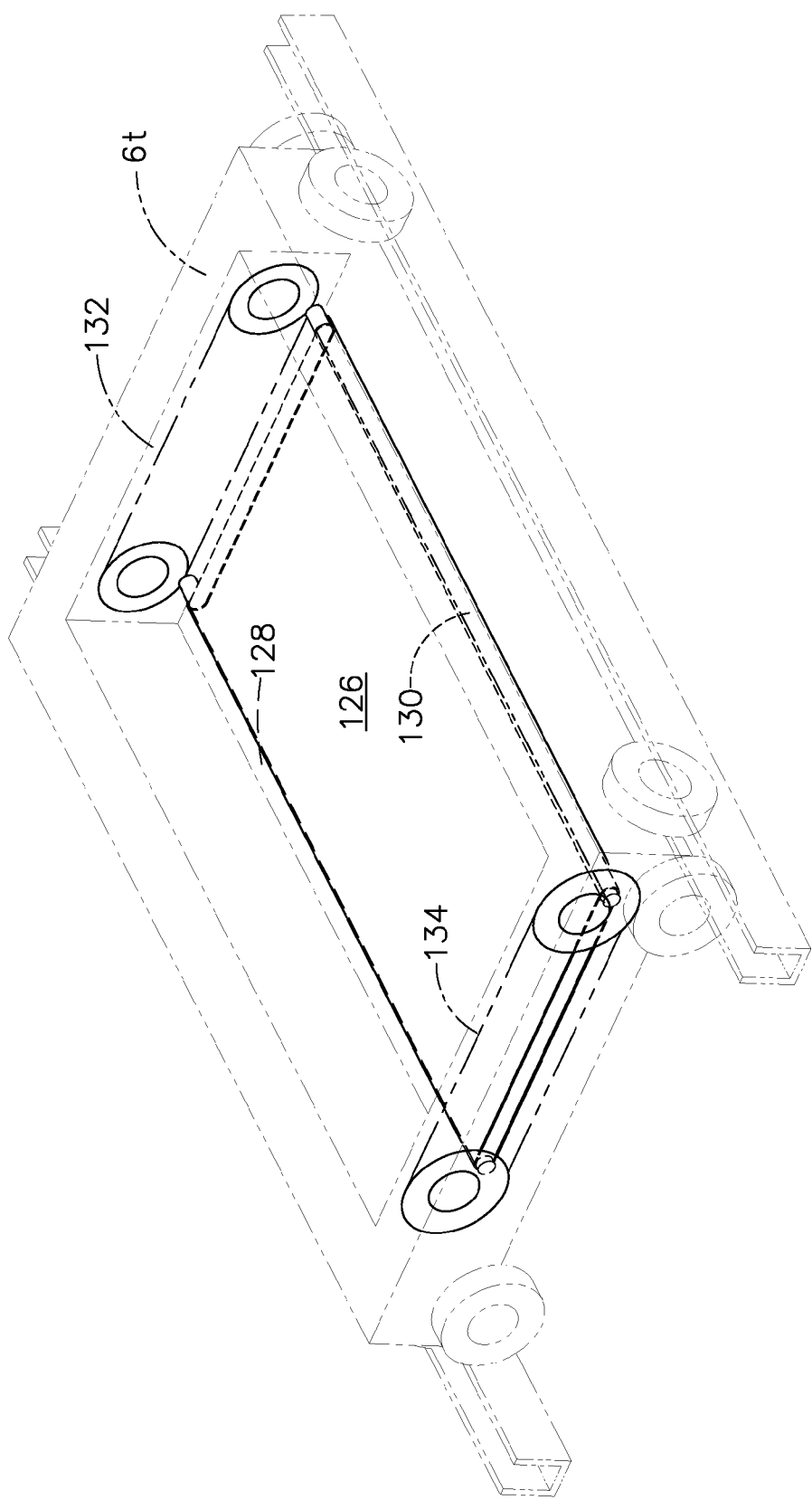
FIG. 33 is a diagrammatic perspective illustration of a cart having a flipping flexible floor which may sort or discharge an article out the bottom.

FIG. 33 is a diagrammatic perspective illustration of cart 6*t* having a flipping flexible floor 126 which may sort or discharge an article out the bottom of cart 6*t*. Bottom 126 is depicted as flexible material which may hang in a sling fashion or be tautly stretched between two rigid side members 128, 130. Ends of members 128, 130 engage conveyors 132, 134. As conveyors 132, 134 advance in the same direction, bottom 126 will flip over and any article will fall out the bottom to an underlying cart not shown.

Figure 29:
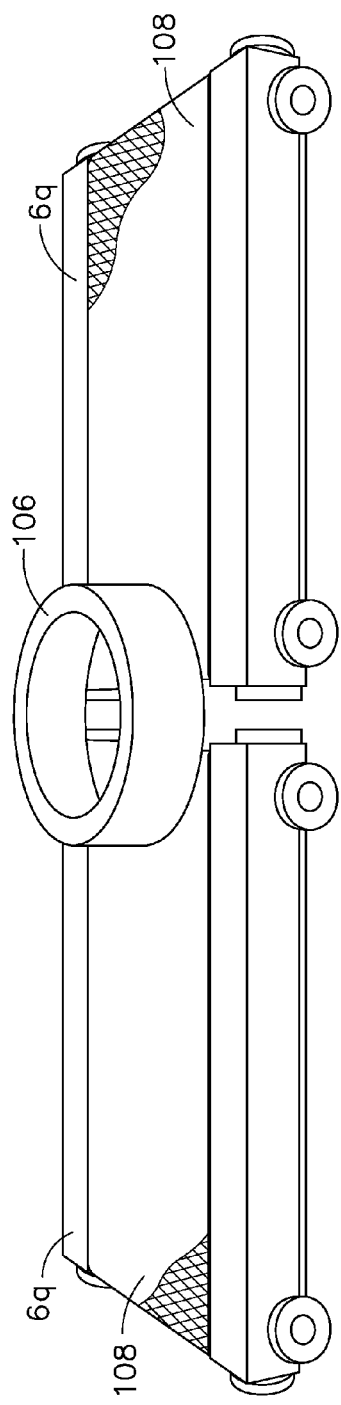
FIG. 29 is diagrammatic perspective illustration of two carts with longitudinally disposed conveying belts functioning in coordination with each other to transfer an article therebetween.

FIG. 29 illustrates carts 6*q* illustrate article 106 being transferred from one cart to the other by longitudinal conveyor belt 108.

Figure 30:
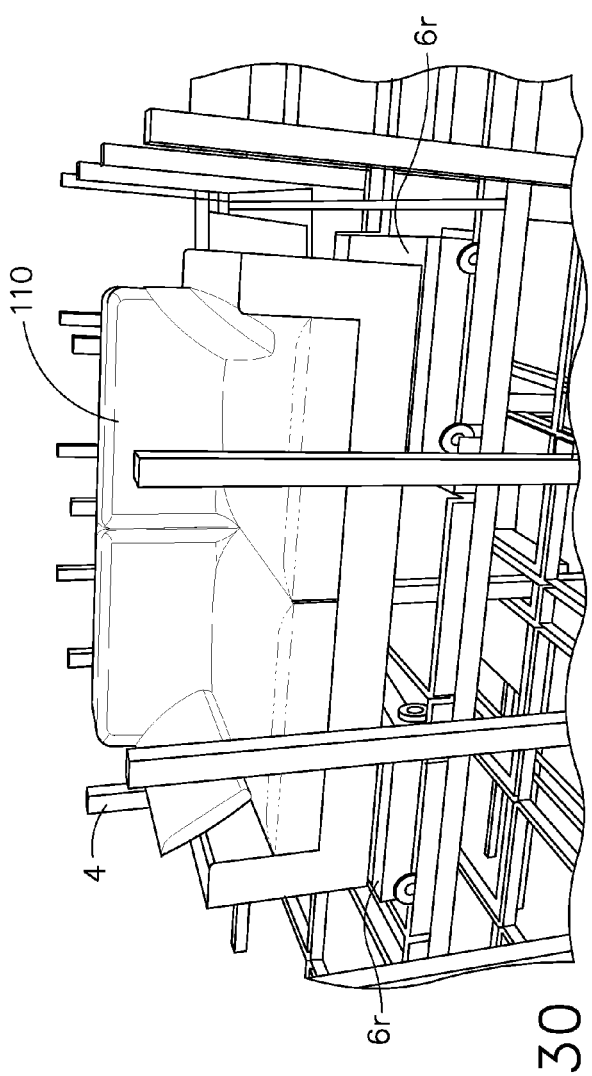
FIG. 30 is diagrammatic perspective illustration of two carts with longitudinally disposed conveying belts functioning in coordination with each other to carry a single article.

FIG. 30 illustrates two carts 6*r* functioning together to carry a single article 110, depicted as a couch. In warehouse system 2, two or more carts 6 may be directed to function together to move a single article. Movement of carts 6*r* must be coordinated, and the paths traveled capable of accommodating turns with an article spanning a plurality of carts. Carts 6*r* could be configured with a driven or freely rotatable surface supporting and engaging article 110 to accommodate the necessary relative rotational motion between article 110 and carts 6*r* during turns.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executions instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

EXPLICIT DEFINITIONS

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

The foregoing description has been presented for purposes of illustration and description. It is not intended to be exhaustive or to limit the invention to the precise form disclosed. Obvious modifications or variations are possible in light of the above teachings. The embodiment was chosen and described in order to illustrate the principles of the invention and its application to thereby enable one of ordinary skill in the art to utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the invention be defined by the claims submitted herewith.

The invention claimed is:

1. A material handling system for storing and retrieving articles, comprising:
 a. a grid comprising
  i. a first plurality of first paths defined by a plurality of spaced apart tracks extending in a first direction; and
  ii. a second plurality of second paths defined by a plurality of spaced apart tracks extending in a second direction;
 b. a plurality of carts configured to selectively travel along said first and second paths;
 c. a plurality of storage areas, respective portions of a third plurality of said second paths underlying said storage areas, said storage areas configured to support articles above said respective underlying portions such that said carts may travel along said underlying portions without being impeded by articles held by said storage areas; and
 d. a controller in communication with said plurality of carts, wherein said controller comprises at least one processor that executes instructions to cause said carts to perform operations, said operations comprising selectively traveling to any of a plurality of locations within said grid, said travel including traveling along respective underlying portions of said second paths to reach destinations not on said respective underlying portions, and said operations comprising causing a first one of said carts to travel from a first path onto a respective underlying portion of said second paths and wait there while a second one of said carts passes on said first path.

2. The material handling system of claim 1, wherein said operations comprise causing said first one of said carts to return to said first path after said second one of said carts has passed.

3. The material handling system of claim 1, wherein a first plurality of said plurality of carts is configured with a lift configured to engage articles held within said storage area such that said carts may remove such engaged articles from said storage area.

4. The material handling system of claim 1, wherein a plurality of said plurality of carts comprises respective conveying surfaces.

5. The material handling system of claim 1, wherein said grid comprises a plurality of levels, and said instructions cause a plurality of said carts to travel to locations on more than one level.

6. The material handling system of claim 5, wherein said grid comprises at least one third path leading between said levels, and wherein said instructions cause said carts to travel along said third paths when traveling between locations on different levels.

7. The material handling system of claim 6, wherein said at least one third path comprises an elevator.

8. The material handling system of claim 6, wherein said at least one third path comprises an inclined path.

9. A controller for controlling a material handling system comprising a grid comprising a first plurality of first paths defined by a plurality of spaced apart tracks extending in a first direction; and a second plurality of second paths defined by a plurality of spaced apart tracks extending in a second direction; a plurality of carts configured to selectively travel along said first and second paths; and a plurality of storage areas, respective portions of a third plurality of said second paths underlying said storage areas, said storage areas configured to support articles above said respective underlying portions such that said carts may travel along said underlying portions without being impeded by articles held by said storage areas; wherein said wherein the controller comprises at least one processor that executes instructions to cause said carts to perform operations, said operations comprising selectively traveling to any of a plurality of locations within said grid, said travel including traveling along respective underlying portions of said second paths to reach destinations not on said respective underlying portions, and said operations comprising causing a first one of said carts to travel from a first path onto a respective underlying portion of said second paths and wait there while a second one of said carts passes on said first path.

10. The controller of claim 9, wherein said operations comprise causing said first one of said carts to return to said first path after said second one of said carts has passed.

* * * * *